(12) United States Patent
Dinh et al.

(10) Patent No.: US 11,258,675 B2
(45) Date of Patent: Feb. 22, 2022

(54) MESSAGE ORIENTED MIDDLEWARE TOPOLOGY EXPLORER

(71) Applicant: Dell Products L.P., Round Rock, TX (US)

(72) Inventors: Hung Dinh, Austin, TX (US); Satish Ranjan Das, Round Rock, TX (US); Manikandan Pammal Rathinavelu, Cedar Park, TX (US); Jonathan Andrew Hernandez, Pflugerville, TX (US); Peter John Sarkis, Austin, TX (US); Abhijit Mishra, Bangalore (IN); Panguluru Vijaya Sekhar, Bangalore (IN); Tousif Mohammed, Bangalore (IN); Nagireddy Bonthu, Hyderabad (IN); Saravanan Kannan, Bangalore (IN); Krishna Mohan Akkinapalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 16/666,833

(22) Filed: Oct. 29, 2019

(65) Prior Publication Data
US 2021/0126837 A1 Apr. 29, 2021

(51) Int. Cl.
*G06F 3/0484* (2013.01)
*H04L 12/24* (2006.01)
(Continued)

(52) U.S. Cl.
CPC .......... *H04L 41/22* (2013.01); *G06F 3/04842* (2013.01); *H04L 41/026* (2013.01); *H04L 41/12* (2013.01); *H04L 67/1097* (2013.01)

(58) Field of Classification Search
CPC ....... H04L 41/12; H04L 41/22; H04L 41/026; H04L 67/1097; G06F 3/04842; G06F 9/546
See application file for complete search history.

(56) References Cited

U.S. PATENT DOCUMENTS

2004/0039742 A1\* 2/2004 Barsness ............... G06F 16/252
2005/0223368 A1\* 10/2005 Smith .................. G06F 11/3636
717/128

(Continued)

OTHER PUBLICATIONS

Cloudamqp, "Part 4: RabbitMQ Exchanges, Routing Keys and Bindings," https://www.cloudamqp.com/blog/2015-09-03-part4-rabbitmq-for-beginners-exchanges-routing-keys-bindings.html, Sep. 24, 2019, 25 pages.

*Primary Examiner* — David R Lazaro
*Assistant Examiner* — Xiang Yu
(74) *Attorney, Agent, or Firm* — Ryan, Mason & Lewis, LLP

(57) ABSTRACT

A method includes retrieving vendor specific data from one or more message oriented middleware servers of a message oriented middleware infrastructure, and inputting the vendor specific data from the one or more message oriented middleware servers into a back-end database. The vendor specific data is converted into commonly formatted data, and the commonly formatted data is inputted into a front-end database. The method also includes retrieving the commonly formatted data from the front-end database, and displaying the commonly formatted data on a user interface providing a visualization of a topology of the message oriented middleware infrastructure.

20 Claims, 17 Drawing Sheets

(51) Int. Cl.
*H04L 29/08* (2006.01)
*H04L 41/22* (2022.01)
*H04L 41/026* (2022.01)
*H04L 67/1097* (2022.01)
*H04L 41/12* (2022.01)
*G06F 3/04842* (2022.01)

(56) References Cited

U.S. PATENT DOCUMENTS

| | | | |
|---|---|---|---|
| 2014/0096058 A1* | 4/2014 | Molesky | G06F 40/103 715/771 |
| 2015/0113118 A1* | 4/2015 | Jain | H04L 41/145 709/224 |
| 2016/0261395 A1* | 9/2016 | Agarwal | H04L 67/42 |
| 2017/0180289 A1* | 6/2017 | Chiappone | H04L 67/2809 |

* cited by examiner

MESSAGE ORIENTED MIDDLEWARE TOPOLOGY EXPLORER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for providing an interface for viewing a messaging topology.

BACKGROUND

Message Oriented Middleware (MOM) is a form of middleware which is capable of facilitating transportation of messages from one component to another, and is critical to the operations of various enterprises. For example, enterprises may include applications using MOM infrastructures to process millions of messages each day.

Current systems simultaneously rely on different MOM products for managing messaging, which are executed on a distributed architecture incorporating various servers. The front-end tools and administrative commands needed to administer and support the MOM products are not consistent across the different MOM platforms. For example, to examine and validate the status of integrations between various MOM products, a user must traverse through multiple screens of user interfaces (UIs), and through multiple tools and servers.

Existing techniques for examining MOM infrastructure topology are heavily dependent on administrator knowledge of proprietary protocols and commands of the respective MOM platforms, and fail to provide adequate solutions to address the increased complexity associated with interfacing with different MOM products to obtain messaging landscape and status information.

SUMMARY

Illustrative embodiments correspond to techniques for providing a complete visualization of a messaging infrastructure, including a configuration and runtime statuses of components of the messaging infrastructure. Embodiments advantageously provide a single user interface to view integrated MOM server statistics regardless of proprietary vendor protocols and commands.

In one embodiment, a method comprises retrieving vendor specific data from one or more message oriented middleware servers of a message oriented middleware infrastructure, and inputting the vendor specific data from the one or more message oriented middleware servers into a back-end database. The vendor specific data is converted into commonly formatted data, and the commonly formatted data is inputted into a front-end database. The method also includes retrieving the commonly formatted data from the front-end database, and displaying the commonly formatted data on a user interface providing a visualization of a topology of the message oriented middleware infrastructure.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
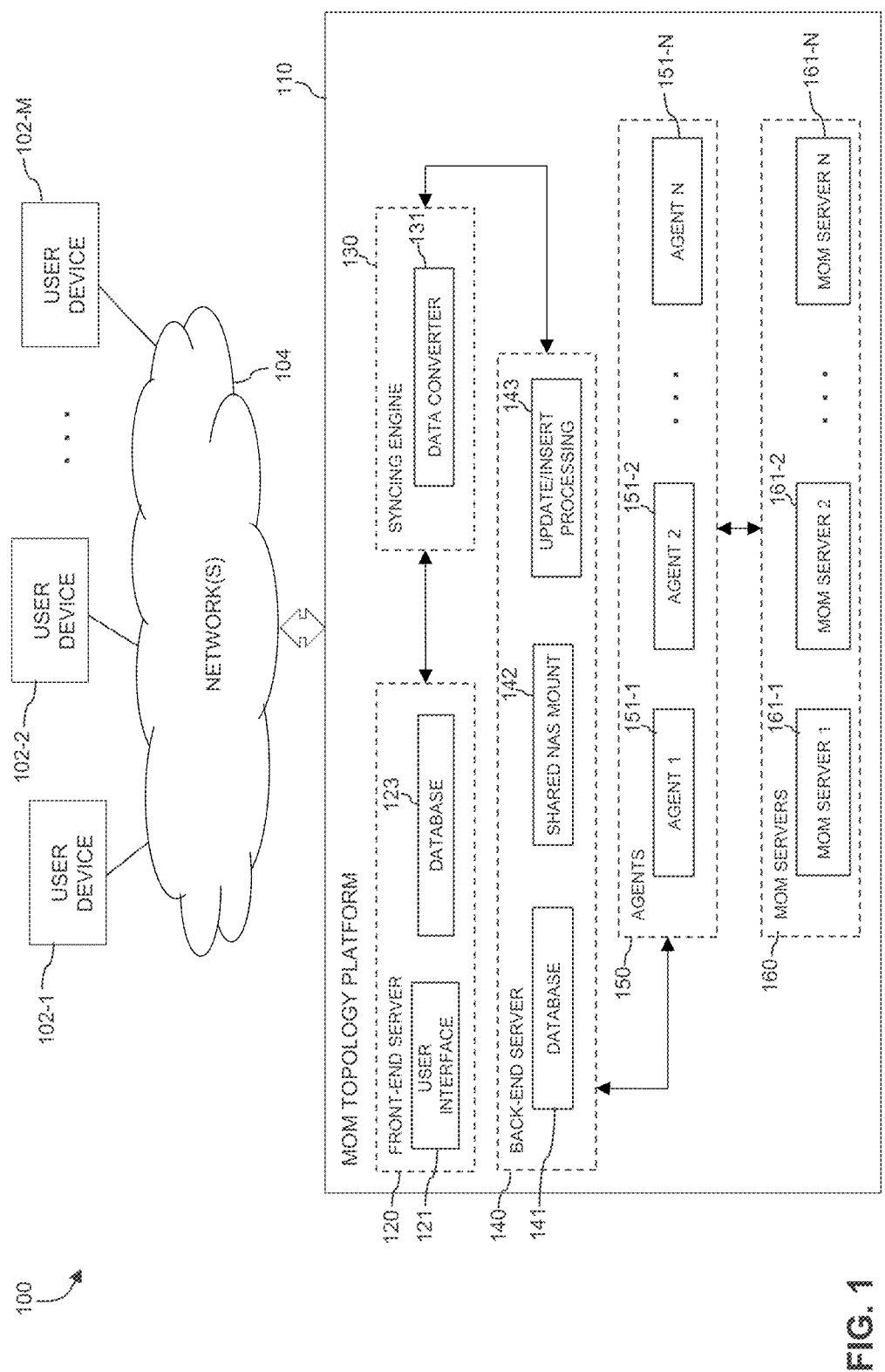
FIG. 1 is a block diagram of an information processing system comprising a MOM topology platform configured for providing a user interface for viewing a messaging landscape and status information in an illustrative embodiment.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a MOM topology platform 110.

The user devices 102 can comprise, for example, Internet of Things (IoT) devices, desktop, laptop or tablet computers, mobile telephones, or other types of processing devices capable of communicating with the MOM topology platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and N are assumed to be arbitrary positive integers greater than or equal to two.

The term "client" or "user" herein is intended to be broadly construed so as to encompass numerous arrangements of human, hardware, software or firmware entities, as well as combinations of such entities. MOM topology services may be provided for users utilizing one or more machine learning models, although it is to be appreciated that other types of infrastructure arrangements could be used. At least a portion of the available services and functionalities provided by the MOM topology platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the MOM topology platform 110, as well as to support communication between the MOM topology platform 110 and connected devices (e.g., user devices 102) and/or other related systems and devices not explicitly shown.

In some embodiments, the user devices 102 are assumed to be associated with repair technicians, system administrators, information technology (IT) managers, software developers or other authorized personnel configured to access and utilize the MOM topology platform 110.

The MOM topology platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The MOM topology platform 110, on behalf of respective infrastructure tenants each corresponding to one or more users associated with respective ones of the user devices 102, provides a user interface which provides a complete view of a messaging landscape and its runtime status. According to embodiments, the MOM topology platform 110 provides users with a visualization of a topology of a messaging landscape, and integration status and statistics independent of propriety MOM vendor protocol implementation and commands. The MOM topology platform 110 is configured for providing users with access to heterogeneous MOM servers, as well as data analytics, statistics and alerts associated messaging being performed on and between the heterogeneous MOM servers.

Referring to FIG. 1, the MOM topology platform 110 includes front-end server 120, a syncing engine 130, a back-end server 140, an agents layer 150, and a MOM servers layer 160.

The front-end server 120 includes a user interface component 121 and a front-end database 123. The syncing engine 130 includes a data converter 131. The back-end server 140 includes a back-end database 141, a shared network-attached storage (NAS) mount 142 and an update/insert processing component 143. The agents layer 150 includes a plurality of software agents 151-1, 151-2, . . . 151-N (collectively "agents 151"), which are respectively associated with a plurality of MOM servers 161-1, 161-2, . . . 161-N (collectively "MOM servers 161") of a MOM servers layer 160. As will be explained further herein, different software agents 151 are configured to interface with different MOM servers 161 corresponding to different MOM platform vendors. For example, a particular software agent 151 is configured to connect to a MOM vendor specific protocol and fetch data in a native command format associated with a particular vendor specific protocol.

According to embodiments, two or more MOM servers 161 may be provided by the same vendor and run on the same protocol. In this case, two or more software agents 151 having the same programming may be used to interface with and retrieve data from the two or more MOM servers 161 running on the same protocol.

Figure 2:
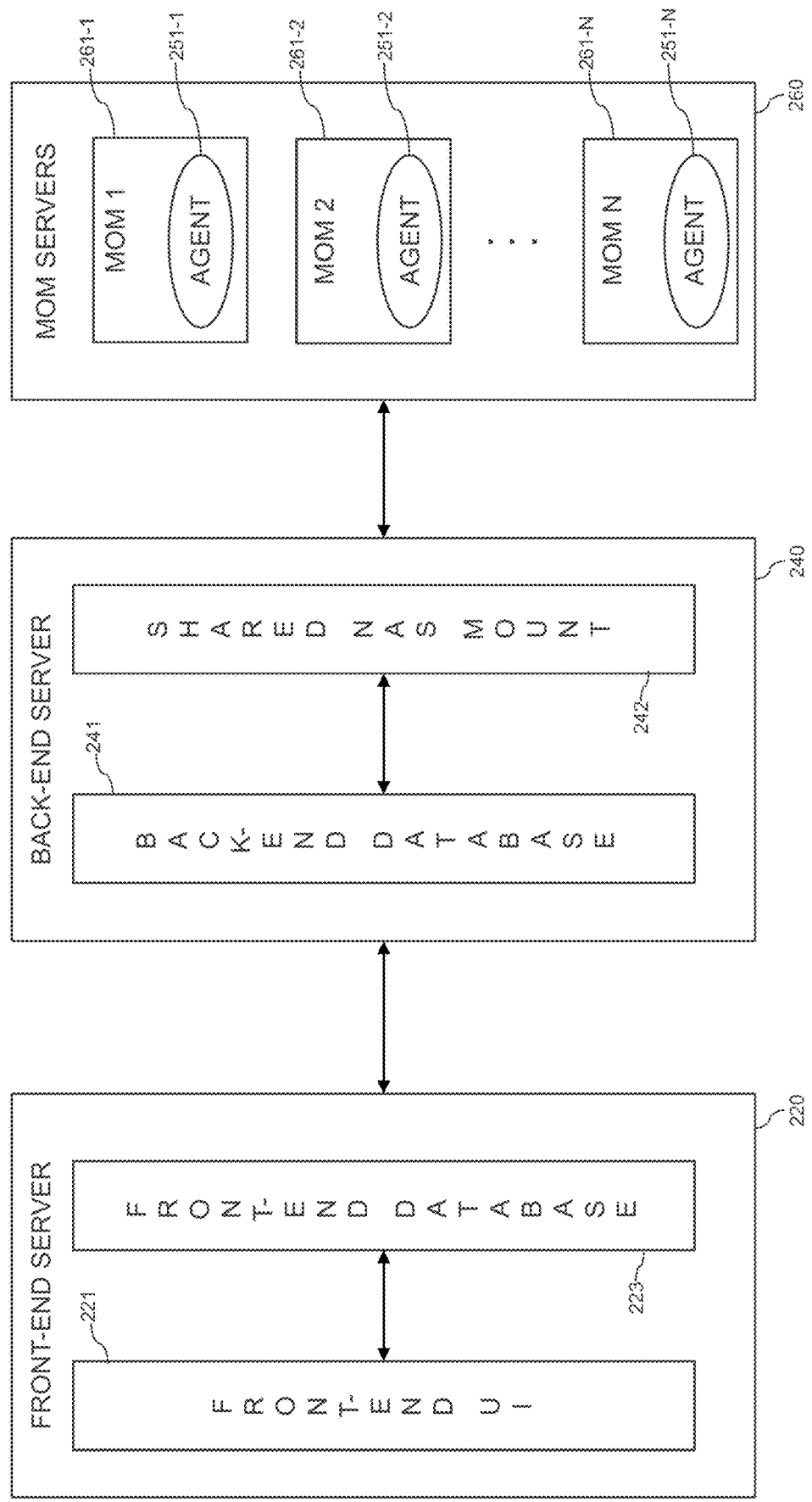
FIG. 2 is a block diagram of an architecture of the MOM topology platform in an illustrative embodiment.

In the block diagram of the architecture of the MOM topology platform 110 shown in FIG. 2, the front-end server 220, front-end user interface (UI) component 221, front-end database 223, back-end server 240, back-end database 241, shared NAS mount 242, MOM servers layer 260, MOM servers 261-1, 261-2, . . . 261-N (collectively "MOM servers 261") and software agents 251-1, 251-2, . . . 251-N (collectively "agents 251") respectively correspond to the front-end server 120, user interface component 121, front-end database 123, back-end server 140, back-end database 141, shared NAS mount 142, MOM servers 161 and software agents 151 of FIG. 1.

Referring to FIGS. 1 and 2, the MOM topology platform 110 utilizes one or more software agents 151/251 configured to connect to one or more MOM servers 161/261 and to retrieve vendor specific data from the one or more MOM servers of a MOM infrastructure. The MOM servers 161/261 permit data exchange between distributed applications by sending and receiving messages. For example, an application with data to distribute (e.g., producer or publisher) sends a message with the data to another connected application (e.g., consumer or subscriber) configured to receive the message. The message is sent via one or more MOM servers 161/261 to the connected application.

The applications comprise, for example: (i) platforms for business process automation, which enable communication between different software systems used in an enterprise; (ii) platforms to provide programming language interoperability; (iii) platforms to provide support for web applications through, for example, servlets, struts or Java® Server Pages (JSPs); (iv) platforms for programming using certain programming languages (e.g., C, C++) to create, for example, computer applications, firmware, verification software, test code and/or simulators for various applications and hardware products; (v) platforms to provide service-oriented architecture (SOA) services including, but not necessarily limited to, distributed application components incorporating discovery, access control, data mapping and security features; and (vi) platforms to provide microservices including, but not necessarily limited to, collections of loosely coupled, fine-grained and parallelized services implementing lightweight protocols.

The applications may be operatively coupled (e.g., via one or more communication networks) to one or more back-end services. In accordance with the present disclosure, the one or more back-end services can include, for example, database management systems, such as database servers for storing and retrieving data as requested by applications, third-party customer relationship management (CRM) applications providing enterprises with an interface for case and task management, and cloud environments for enterprise solutions including, for example, information management, compliance, and business-to-business (B2B) integration.

The MOM servers 161/261 include architectures with, for example, application programming interfaces (APIs) and administrative tools to route and deliver messages. In an embodiment, the MOM servers 161-1, 161-2, . . . 161-N or 261-1, 261-2, . . . 261-N respectively run on different operating systems and/or platforms or different implementations of the same operating system and/or platforms. For example, the MOM servers 161/261 are of different types, and require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA lightweight machine to machine (LWM2M).

In a non-limiting example, the MOM servers 161/261 can respectively correspond to different sources, which run different software and have different capabilities. Some non-limiting examples of MOM servers 161/261 are IBM® MQ (International Business Machines Corporation, Armonk, N.Y.), RabbitMQ® (Pivotal Software, Inc., San Francisco, Calif.), Apache™ActiveMQ® and Apache™ Kafka® (Apache Software Foundation, Wakefield, Mass.). One or more of the MOM servers 161/261 can be, for example, closed and proprietary, while one or more other MOM servers 161/261 can be, for example, open source.

Each of the software agents 151/251 is compatible with the vendor specific software, commands, formats and data of the MOM server 161/261 to which it is connected. The software agents 151/251 are executed to retrieve vendor specific data from the MOM server 161/261 to which they are connected. For example, a first software agent 151-1/251-1 may include code for retrieving data from a first MOM server 161-1/261-1 running a platform of a first vendor (e.g., IBM® MQ), a second software agent 151-2/251-2 may include code for retrieving data from a second MOM server 161-2/261-2 running a platform of a second vendor (e.g., RabbitMQ®), and third software agent 151-N/251-N may include code for retrieving data from a third MOM server 161-N/261-N running a platform of a third vendor (e.g., Apache™ Kafka®).

Figure 14:
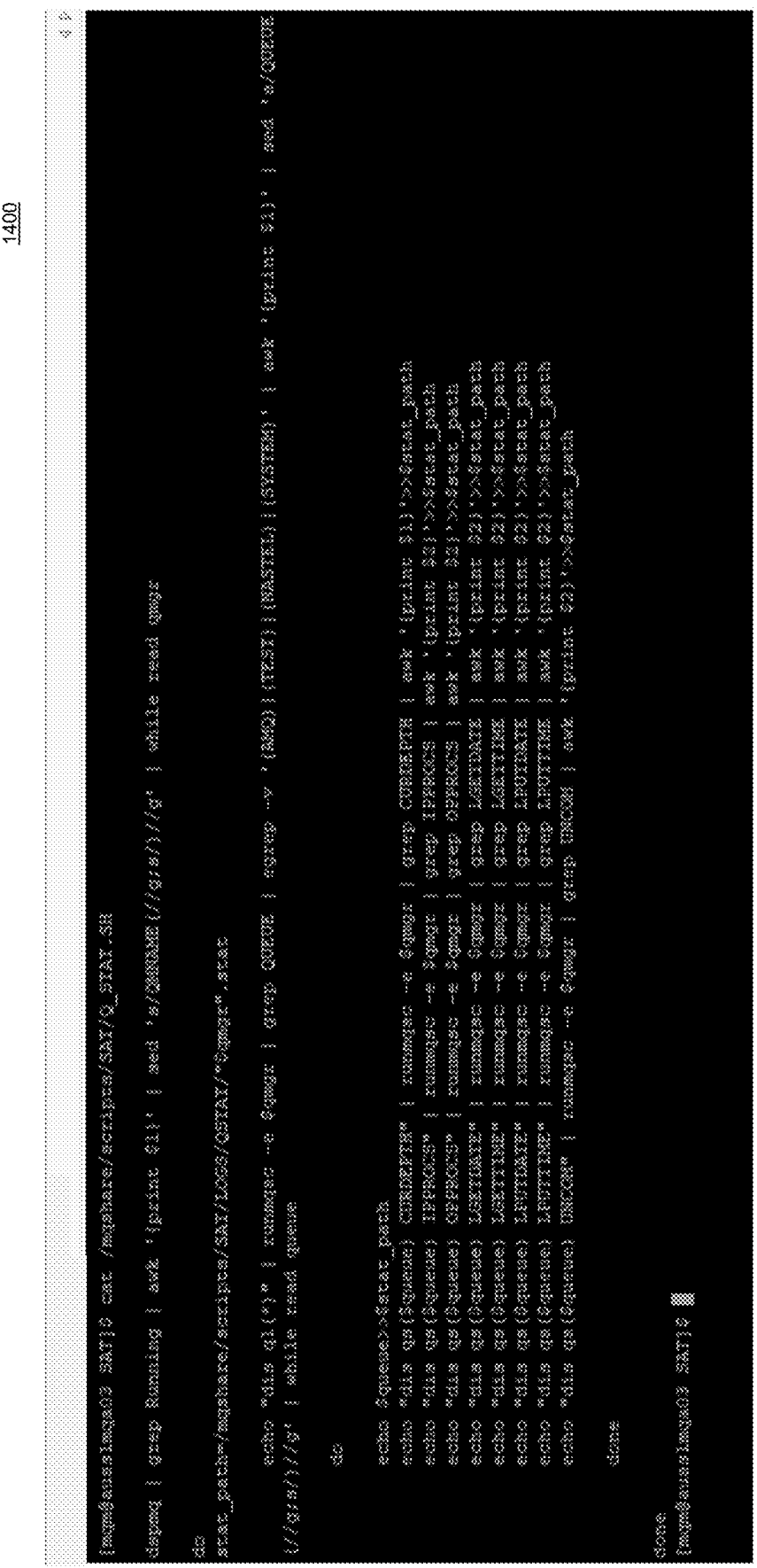
FIG. 14 depicts example pseudocode for a software agent for connecting to a MOM server and retrieving data in a native command format in an illustrative embodiment.

The vendor specific data is in a native command format of the corresponding MOM server 161/261 from which the vendor specific data is retrieved. FIG. 14 depicts example pseudocode 1400 of a software agent 151/251 compatible with a particular MOM server 161/261. The software agent 151/251, when executed, provides a connection to the compatible MOM server 161/261 and enables retrieval of data in the native command format of the compatible MOM server 161/261.

The software agents 151/251 input the retrieved vendor specific data to a shared NAS mount 142/242 where the vendor specific data from each of the MOM servers 161/261 is saved. According to embodiments, the vendor specific data includes statistical data captured from each of the MOM servers 161/261. The statistical data comprises, but is not necessarily limited to, messaging queue names, messaging queue statuses (e.g., online, offline, idle, active), messaging queue locations (e.g., Internet Protocol (IP) addresses, ports), messaging queue types, messaging queue depths, timestamps for messages entering and leaving message queues, transmission times of messages from messaging queues, connections between messaging queues and of messaging queues to message producers and message consumers, total number of messages, and/or message transmission rates. One or more back-end databases 141/241 receive the vendor specific statistical data captured from the MOM servers 161/261 from the shared NAS mount 142/242. According to one or more embodiments, the one or more back-end databases 141/241 are regularly updated with the vendor specific data. For example, updates may occur over relatively short time periods (e.g., every second). The back-end server 140 includes an update/insert processing component to insert/input the vendor specific data to the one or more back-end databases 141/241.

The vendor specific data is transmitted to a syncing engine 130, which includes a data converter 131 to convert the vendor specific statistical data into commonly formatted data including generic MOM terminology. The vendor specific data may be pushed to the syncing engine 130 from the back-end database 141/241 or pulled from the back-end database 141/241. According to one or more embodiments, the commonly formatted data is in JavaScript Object Notation (JSON) format. According to embodiments, the data converter 131 translates the unique terminology of MOM vendors into terminology that can be understood by users viewing the user interface on a user device 102. In a non-limiting illustrative example, the total number of messages in a queue may be represented by different words and/or phrases depending on the MOM provider (e.g., in IBM® MQ and RabbitMQ®, the total number of messages in a queue are referred to as "curdepth" and "messages_ready," respectively), which may be translated to, for example, "total messages" for the user interface view.

The commonly formatted data is inputted from the syncing engine 130 into one or more front-end databases 123/223 of a front-end server 120/220. The commonly formatted data may be pushed to the one or more front-end databases 123/223 from the syncing engine 130 or pulled from the syncing engine 130 over relatively short time periods (e.g., every second).

Users via, for example, user interfaces displayed on user devices 102, can initiate retrieval of the commonly formatted data from the one or more front-end databases 123/223 through one or more application programming interfaces (APIs). A user interface component 121/221 generates a topology visualization of a MOM infrastructure, which includes the commonly formatted data displayed within the topology view on the user interfaces of the user devices 102. For example, referring to FIGS. 9-13, topology views 900, 1000, 1100, 1200 and 1300 illustrate message producers, message consumers and messaging queues connected between the message producers and message consumers. The topology views 900, 1000, 1100, 1200 and 1300 illustrate a configuration of the connections between messaging queues, message producers and message consumers, as well as data corresponding to the message producers, message consumers and messaging queues. The data displayed in the topology views includes, for example, IP addresses and/or ports of the message producers, message consumers and messaging queues, messaging queue depth indicating a number of messages in a queue, messaging queue age indicating how long one or more messages have been waiting in a queue before being transmitted, and a time when a last message was transmitted from a given messaging queue. In one or more embodiments, the topology views also indicate whether a given host, MOM server and/or port is online or offline, message queue names, whether messages are being successfully transmitted, whether message queues are source or target queues, and whether connections are network connections. The topology views further provide illustrations of a type of topology, such as, for example, P2P with or without routing and/or with or without load balancing, many-to-one P2P, fan-out, and publisher/subscriber MOM topologies.

Figure 9:
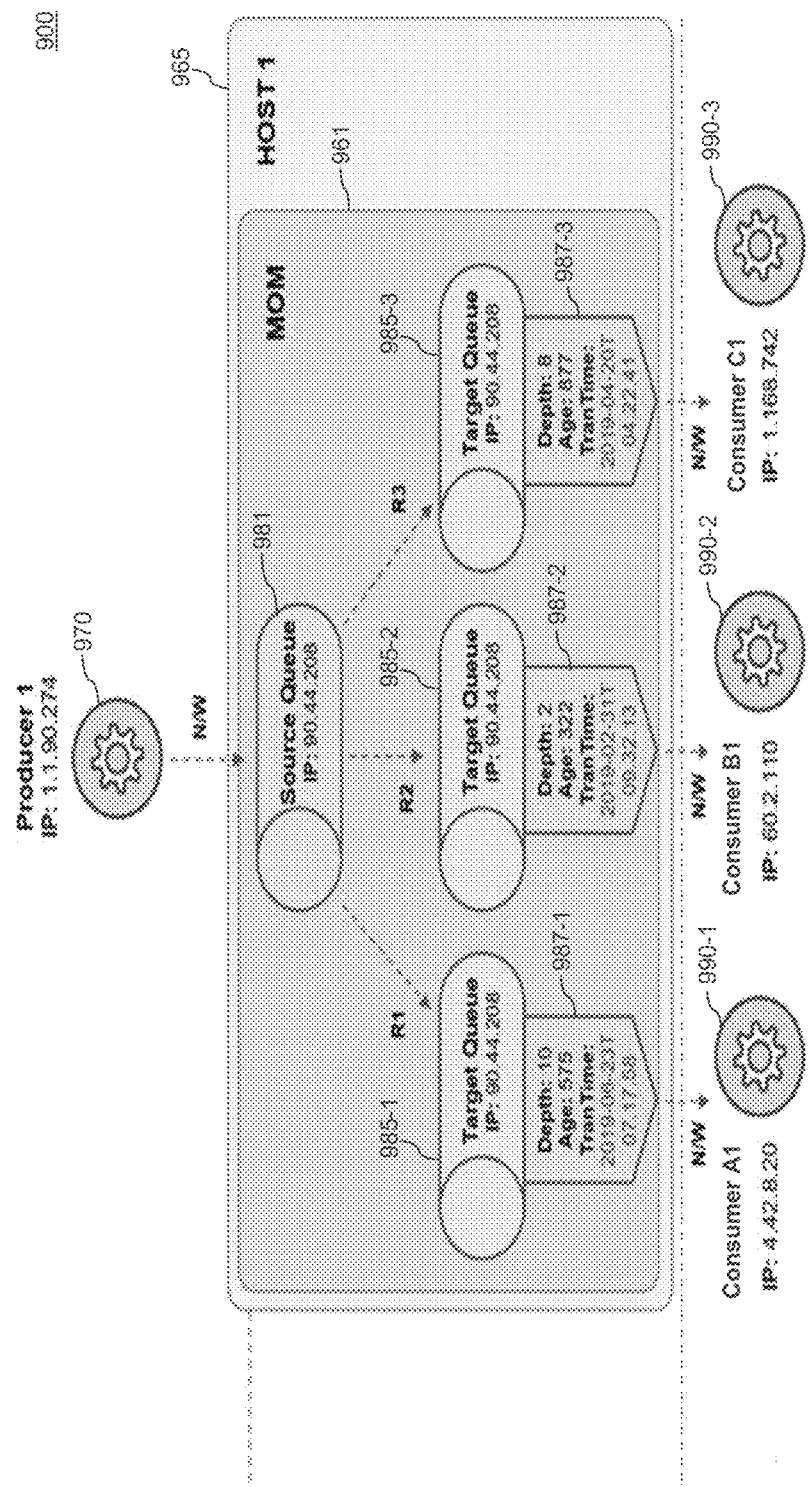
FIG. 9 is a block diagram of a user interface view of a P2P MOM topology with routing in an illustrative embodiment.

More specifically, FIG. 9 illustrates a user interface view of a P2P MOM topology 900 with routing. The user interface topology view 900 includes a plurality of messaging queues 981, 985-1, 985-2 and 985-3 between a message producer 970 and three message consumers 990-1, 990-2 and 990-3. The topology view 900 displays IP addresses associated with each of the messaging queues 981, 985-1, 985-2 and 985-3, message producer 970 and three message consumers 990-1, 990-2 and 990-3. The IP addresses for the messaging queues 981, 985-1, 985-2 and 985-3 are the same because they are on the same MOM server 961 of host 965, which can be a virtual host. The topology view 900 also indicates network connections (N/W) between elements having different IP addresses, such as, for example, between producer 970 and messaging queue 981, between messaging queue 985-1 and consumer 990-1, between messaging queue 985-2 and consumer 990-2, and between messaging queue 985-3 and consumer 990-3. There are no network connections between messaging queue 981 and each of the messaging queues 985-1, 985-2 and 985-3 since these messaging queues are on the same server 961.

Referring to the indicators R1, R2 and R3, the topology view 900 illustrates a routing messaging pattern, where certain messages are routed to particular messaging queues 985-1, 985-2 and/or 985-3 to be sent to corresponding consumers 990-1, 990-2 and/or 990-3. For example, in this case, the producer 970 sends messages to a source queue 981, which is an exchange or routing agent defined by the host 965. The source queue 981 routes the messages to different queues 985-1, 985-2 or 985-3 using, for example, message headers and routing keys. Routing keys are used by the source queue 981 to decide how to route messages to the target queues 985-1, 985-2 or 985-3. For example, a routing key is added to a message header by the producer 970. A message is transmitted to those queues having a binding key that matches a routing key of the message. In operation, the producer 970 publishes a message to the source queue 981 (e.g., exchange), which receives the message and routes the message to appropriate queue(s) 985-1, 985-2 and/or 985-3 based on the routing key. The messages remain in the queues 985-1, 985-2 or 985-3 until they are handled by the consumers 990-1, 990-2 and 990-3.

The topology view 900 further indicates whether a message queue is a source queue functioning as an exchange (e.g., source queue 981) or a target for messages (e.g., target queues 985-1, 985-2 and 985-3). In addition, topology view 900 indicates properties 987-1, 987-2 and 987-3 associated with a messaging queue such as, for example, messaging queue depth indicating a number of messages in a queue, messaging queue age (e.g., in seconds, milliseconds, microseconds or some other appropriate time unit) indicating how long one or more messages have been waiting in a queue before being transmitted, and a time (e.g., date and time of day) when a last message was transmitted from a given messaging queue.

Figure 6:
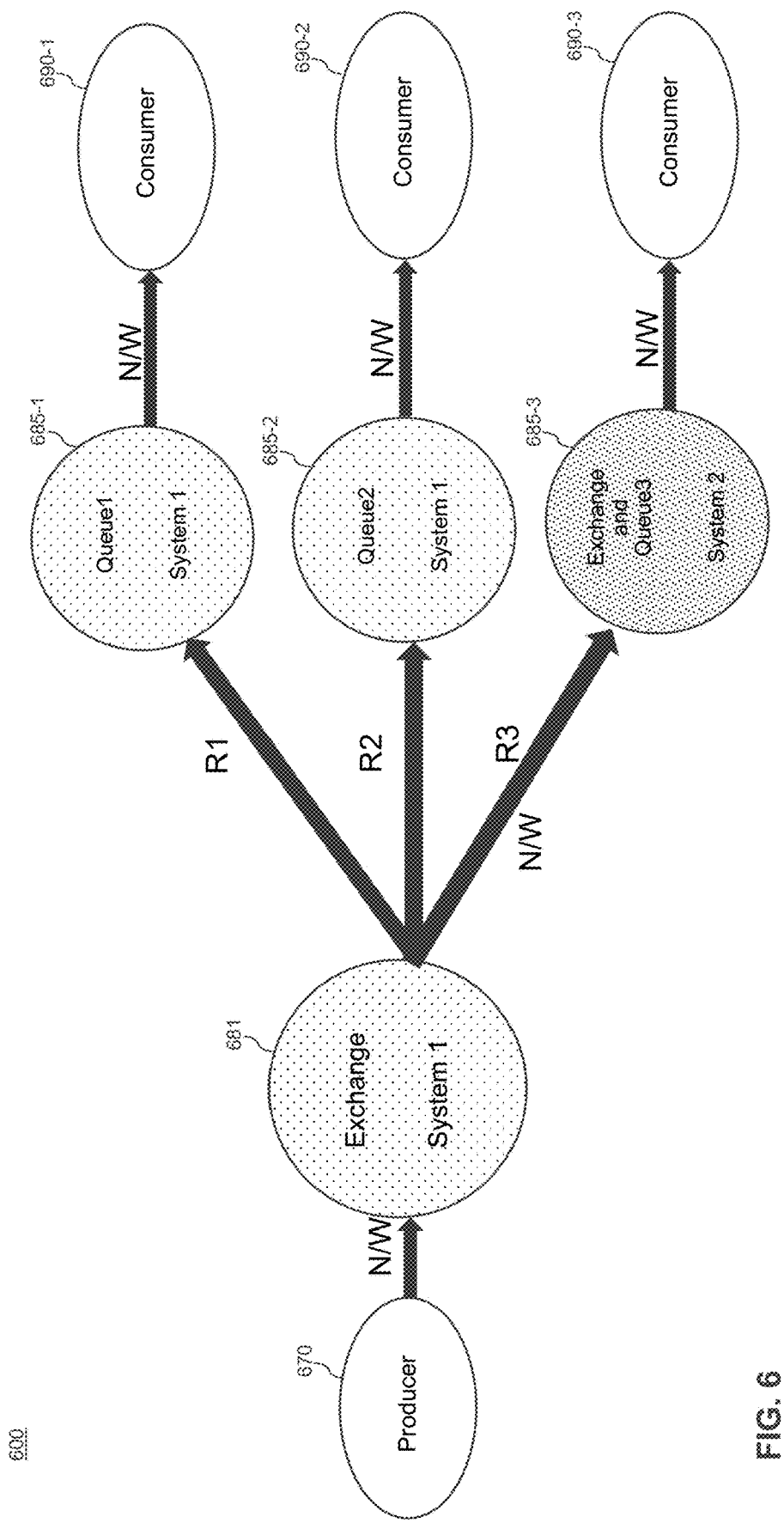
FIG. 6 is a block diagram of a P2P MOM topology with routing in an illustrative embodiment.

Similar to what is shown in FIG. 9, the topology 600 in FIG. 6 is an example of a P2P MOM topology with routing. In FIG. 6, a producer 670 is connected to an exchange 681, which routes messages to queues 685-1 and 685-2 and to an exchange and queue (exchange/queue) 685-3 for consumption by consumers 690-1, 690-2 and 690-3. Similar to FIG. 9, the queues 685-1 and 685-2 are connected to exchange 681 without a network since they are on the same server. FIG. 6 indicates that exchange 681 and queues 685-1 and 685-2 correspond the same MOM platform (System 1). Different from FIG. 9, the exchange/queue 685-3 is on a different server associated with a different MOM platform (System 2), and is connected to the exchange 681 via a network. The producer 670 is connected to exchange 681 via a network, and the queues 685-1 and 685-2 and exchange/queue 685-3 are connected to consumers 690-1, 690-2 and 690-3 via one or more networks.

Figure 10:
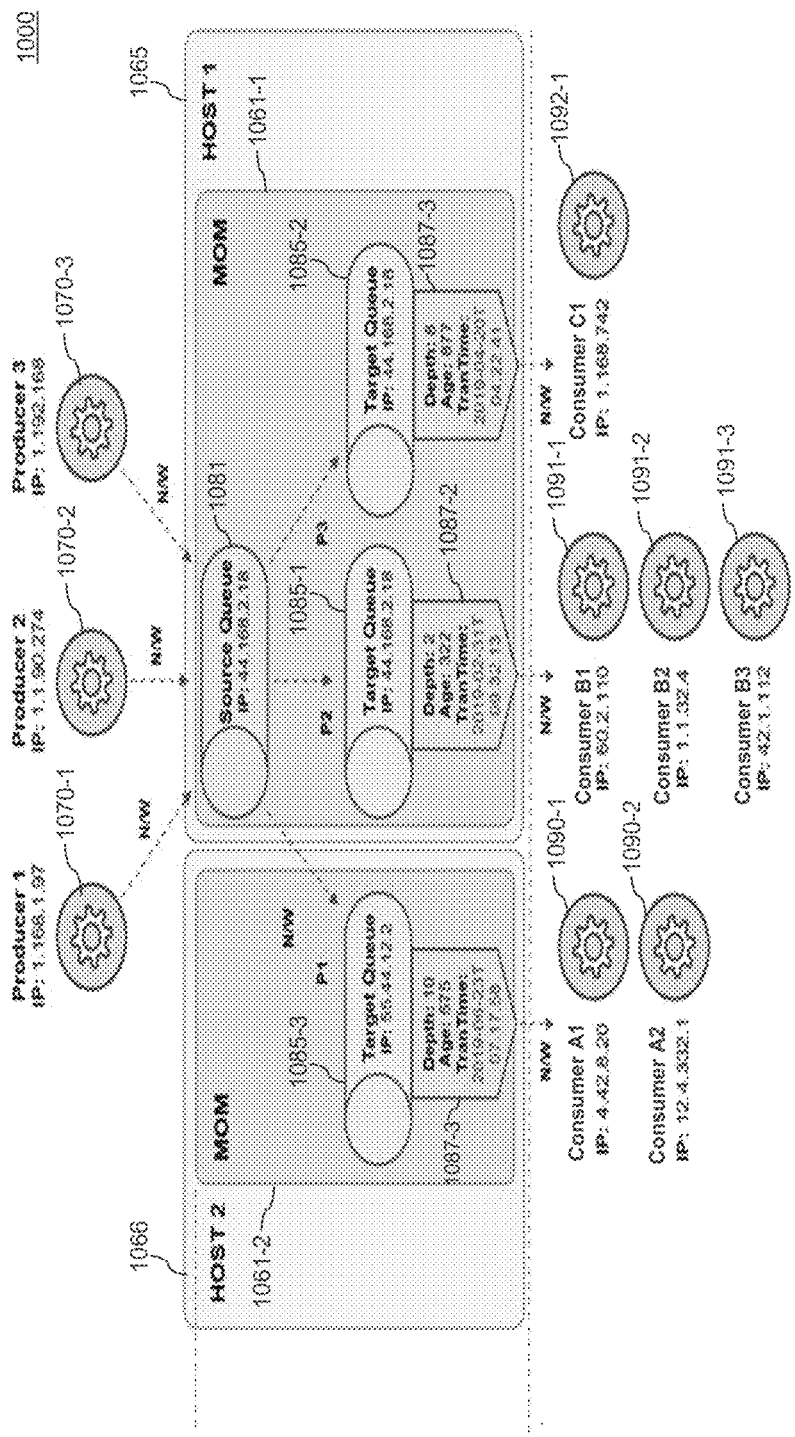
FIG. 10 is a block diagram of a user interface view of a publisher/subscriber MOM topology in an illustrative embodiment.

FIG. 10 is a block diagram of a user interface view of a publisher/subscriber MOM topology in an illustrative embodiment. The user interface topology view 1000 includes a plurality of messaging queues 1081, 1085-1, 1085-2 and 1085-3 between a plurality of message producers 1070-1, 1070-2 and 1070-3 and a plurality of message consumers 1090-1, 1090-2, 1091-1, 1091-2, 1091-3 and 1092-1. The topology view 1000 displays IP addresses associated with each of the messaging queues 1081, 1085-1, 1085-2 and 1085-3, message producers 1070-1, 1070-2 and 1070-3 and message consumers 1090-1, 1090-2, 1091-1, 1091-2, 1091-3 and 1092-1. The IP addresses for the messaging queues 1081, 1085-1 and 1085-2 are the same because they are on the same MOM server 1061-1 of host 1065. The IP address of queue 1085-3 corresponds to MOM server 1061-2 of host 1066, and is different from that of queues 1081, 1085-1 and 1085-2. Hosts 1065 and 1066 can be virtual hosts.

The topology view 1000 indicates network connections (N/W) between elements having different IP addresses, such as, for example, between producers 1070-1, 1070-2 and 1070-3 and messaging queue 1081, between messaging queue 1081 and messaging queue 1085-3, between messaging queue 1085-1 and consumer 1091-1, consumer 1091-2 or consumer 1091-3, between messaging queue 1085-2 and consumer 1092-1, and between messaging queue 1085-3 and consumer 1090-1 or consumer 1090-2. There are no network connections between messaging queue 1081 and each of the messaging queues 1085-1 and 1085-2 since these messaging queues are on the same server 1061-1.

Referring to the indicators P1, P2 and P3, the topology view 1000 illustrates a publisher/subscriber messaging pattern, where certain messages are routed to particular messaging queues 1085-1, 1085-2 and/or 1085-3 based on subscriptions by consumers 1090-1, 1090-2, 1091-1, 1091-2, 1091-3 and 1092-1. For example, in this case, the message producers 1070-1, 1070-2 and 1070-3 send messages to a source queue 1081, which is an exchange agent defined by the host 1065. The source queue 1081 routes the messages to different queues 1085-1, 1085-2 and 1085-3 based on, for example, the topics of the messages and whether the consumers 1090-1, 1090-2, 1091-1, 1091-2, 1091-3 and 1092-1 are subscribed to a particular topic. In one or more embodiments, the message producers 1070-1, 1070-2 and 1070-3 categorize the messages sent to the source queue 1081 into one or more topics, which may be indicated in message headers. The source queue 1081 then determines which target queues 1085-1, 1085-2 and 1085-3 should receive the messages based whether subscriptions of the consumers 1090-1, 1090-2, 1091-1, 1091-2, 1091-3 and/or 1092-1 cover the topics. The messages are transmitted to those target queues 1085-1, 1085-2 and/or 1085-3 corresponding to consumers having subscriptions covering the topics.

Similar to the topology view in FIG. 9, the topology view 1000 further indicates whether a message queue is a source queue functioning as an exchange (e.g., source queue 1081) or a target for messages (e.g., target queues 1085-1, 1085-2 and 1085-3). In addition, topology view 1000 indicates properties 1087-1, 1087-2 and 1087-3 associated with a messaging queue such as, for example, messaging queue depth, messaging queue age, and a time when a last message was transmitted from a given messaging queue.

Figure 8:
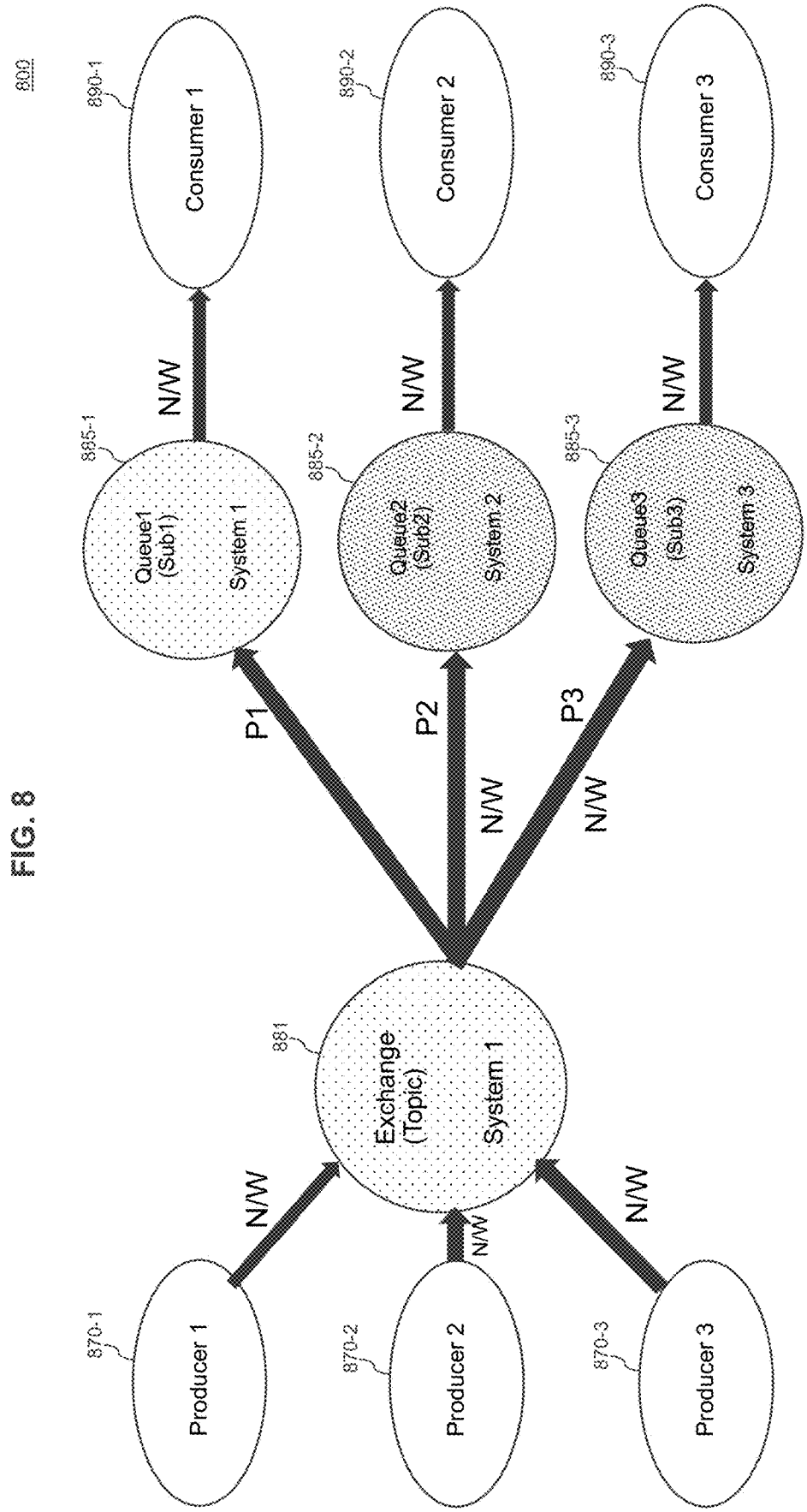
FIG. 8 is a block diagram of a publisher/subscriber MOM topology in an illustrative embodiment.

Similar to what is shown in FIG. 10, the topology 800 in FIG. 8 is an example of a publisher/subscriber MOM topology. In FIG. 8, producers 870-1, 870-2 and 870-3 are connected to an exchange 881, which routes messages to messaging queues 885-1, 885-2 and 885-3 for consumption by consumers 890-1, 890-2 and 890-3. Queue1 885-1 is connected to exchange 881 without a network since they are on the same server. FIG. 8 indicates that exchange 881 and queue1 885-1 correspond the same MOM platform (System 1). Queue2 and Queue3 885-2 and 885-3 are on different servers associated with different MOM platforms (System 2 and System 3), and are connected to the exchange 881 via one or more networks. The producers 870-1, 870-2 and 870-3 are connected to exchange 881 via one or more networks, and the queues 885-1, 885-2 and 885-3 are connected to consumers 890-1, 890-2 and 890-3 via one or more networks. Similar to FIG. 10, the indicators P1, P2 and P3 in FIG. 8 illustrate a publisher/subscriber topology 800, where certain messages are routed to particular messaging queues 885-1, 885-2 and/or 885-3 based on subscriptions (Sub1, Sub2 and Sub3) of consumers 890-1, 890-2 and 890-3. For example, in this case, the message producers 870-1, 870-2 and 870-3 send messages to exchange 881, which routes the messages to different queues 885-1, 885-2 and 885-3 based on, for example, the topics of the messages and whether the consumers 890-1, 890-2 and 890-3 are subscribed to a particular topic.

Figure 11:
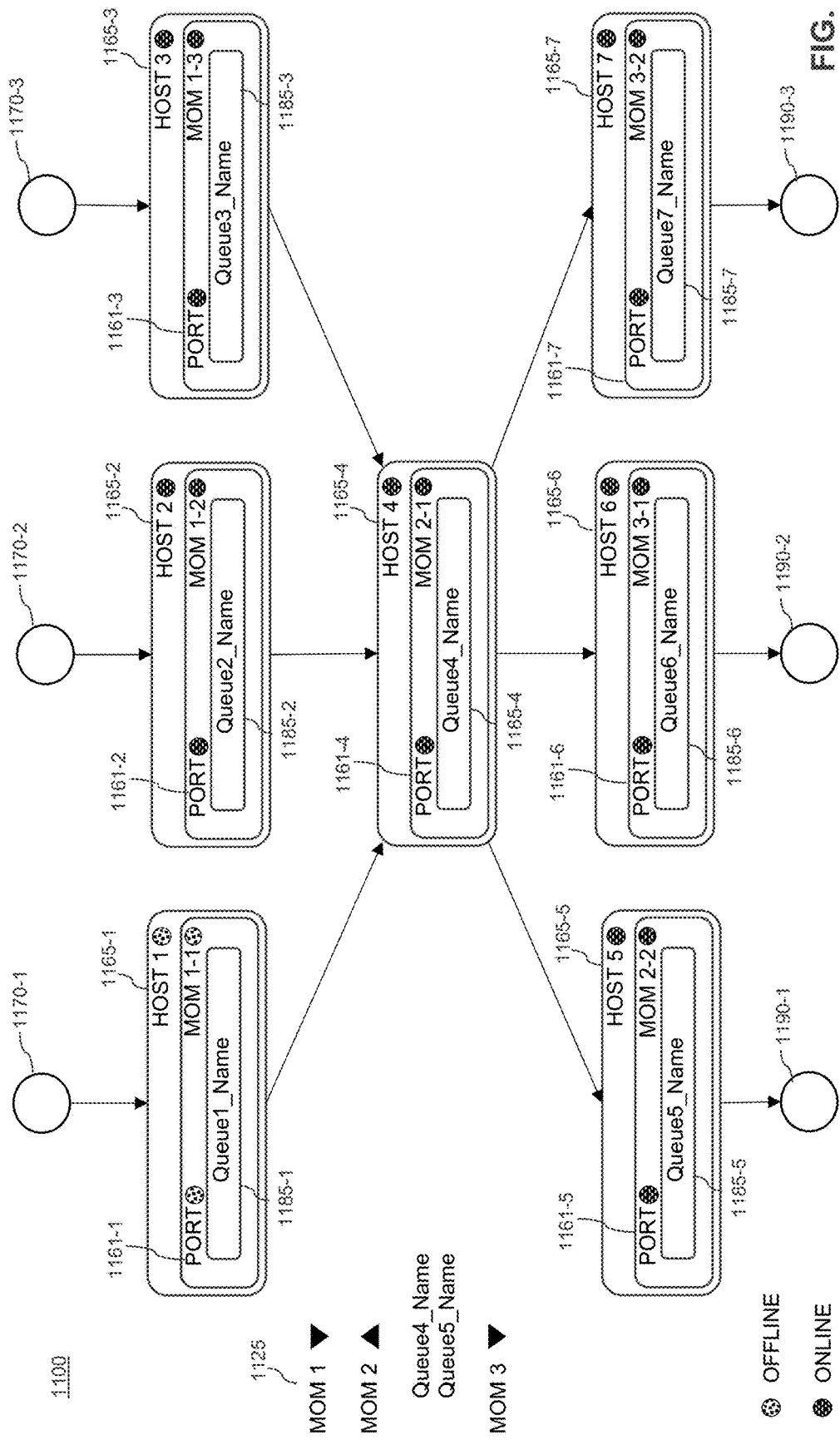
FIG. 11 is a block diagram of a user interface view of a publisher/subscriber MOM topology in an illustrative embodiment.

FIG. 11 is a block diagram of a user interface view of a publisher/subscriber MOM topology in an illustrative embodiment. The user interface topology view 1100 includes a plurality of messaging queues 1185-1, 1185-2, 1185-3, 1185-4, 1185-5, 1185-6 and 1185-7 (collectively "messaging queues 1185) between a plurality of message producers 1170-1, 1170-2 and 1170-3 and a plurality of message consumers 1190-1, 1190-2 and 1190-3. The topology view 1100 displays an online or offline status associated with each of the hosts 1165-1, 1165-2, 1165-3, 1165-4, 1165-5, 1165-6 and 1165-7 (collectively "hosts 1165"), MOM servers 1161-1, 1161-2, 1161-3, 1161-4, 1161-5, 1161-6 and 1161-7 (collectively "MOM servers 1161"), and each of the ports associated with the MOM servers 1161. The online/offline status indicates to a user whether any of the hosts 1165, MOM servers 1161 and/or ports are operational, and if there is a potential problem with hosts 1165, MOM servers 1161 and/or ports that are offline. For example, in FIG. 11, MOM server 1161-1 and the corresponding port, and host 1165-1 are shown as being offline, while the remaining hosts, servers and ports in the topology view 1100 are shown as being online.

The topology view 1100 also indicates the queue name of each of the messaging queues 1185. The topology view 1100 includes a menu 1125, where a user may perform an action on an icon in the menu 1125 (e.g., keystroke, mouse click, pointing, touchscreen contact, etc.) using, for example, a mouse (or pointer, stylus, finger on a mobile device, etc.). Performing an action on an icon in the menu 1125 can expand portions of the menu 1125. For example, as shown in FIG. 11, the queues 1185-4 and 1185-2 associated with a second MOM system (MOM 2), are shown. A user may select a desired MOM system and/or queue to see more information on the selected items and/or to expand portions of the topology view 1100.

The topology view 1100 indicates connections between producers 1170-1, 1170-2 and 1170-3 and messaging queues 1185-1, 1185-2 and 1185-3, respectively, between messaging queues 1185-1, 1185-2 and 1185-3 and messaging queue 1185-4, between messaging queue 1185-4 and messaging queues 1185-5, 1185-6 and 1185-7 and between messaging queues 1185-5, 1185-6 and 1185-7 and consumers 1190-1, 1190-2 and 1190-3, respectively.

Figure 12:
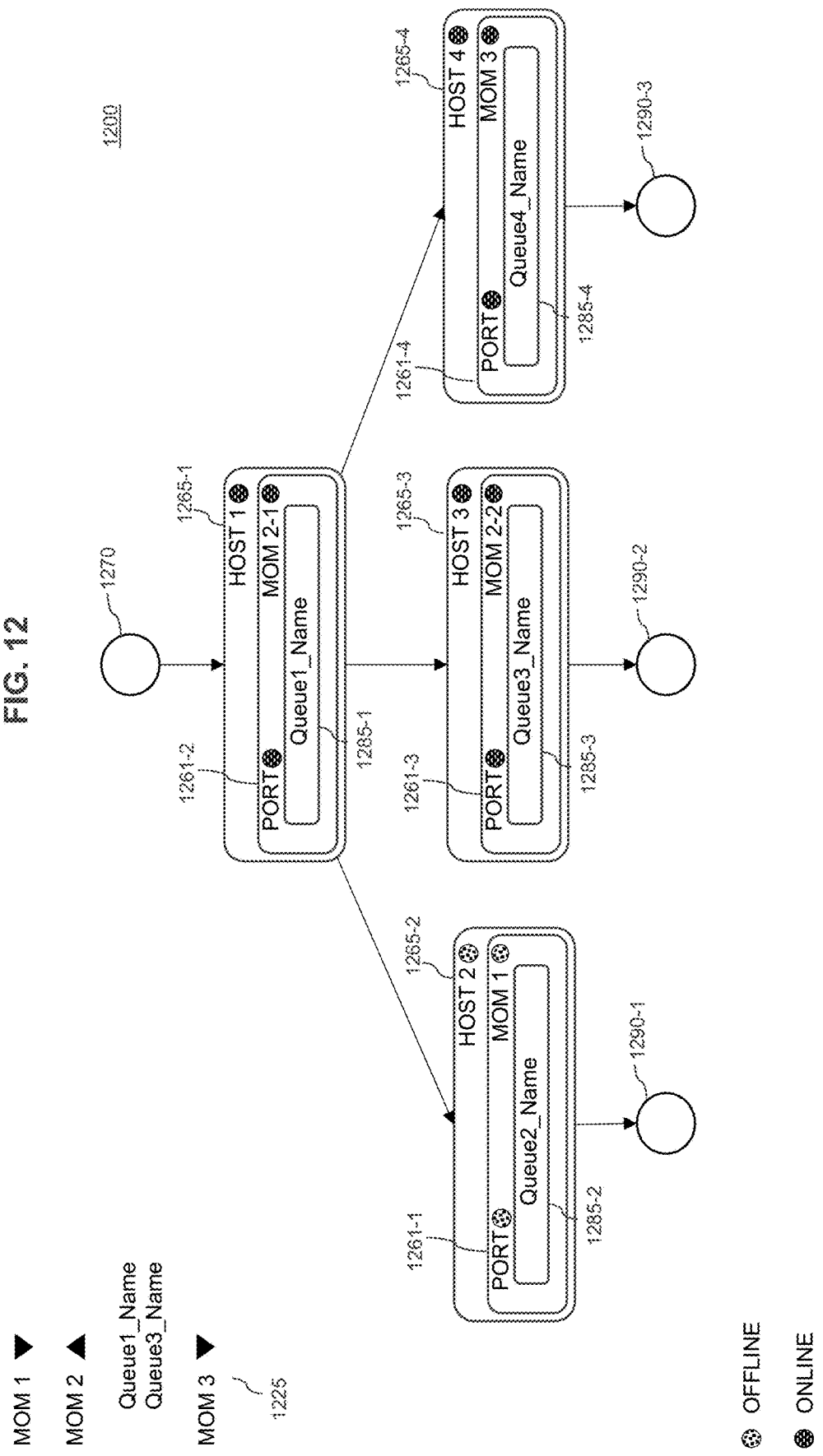
FIG. 12 is a block diagram of a user interface view of a P2P MOM topology with routing in an illustrative embodiment.

FIG. 12 is a block diagram of a user interface view of a P2P MOM topology with routing in an illustrative embodiment. The user interface topology view 1200 includes a plurality of messaging queues 1285-1, 1285-2, 1285-3 and 1285-4 (collectively "messaging queues 1285) between a message producer 1270 and a plurality of message consumers 1290-1, 1290-2 and 1290-3. The topology view 1200 displays an online or offline status associated with each of the hosts 1265-1, 1265-2, 1265-3 and 1265-4 (collectively "hosts 1265"), MOM servers 1261-1, 1261-2, 1261-3 and 1261-4 (collectively "MOM servers 1261"), and each of the ports associated with the MOM servers 1261. The online/offline status indicates to a user whether any of the hosts 1265, MOM servers 1261 and/or ports are operational, and if there is a potential problem with hosts 1265, MOM servers 1261 and/or ports that are offline. For example, in FIG. 12, MOM server 1261-1 and the corresponding port, and host 1265-2 are shown as being offline, while the remaining hosts, servers and ports in the topology view 1200 are shown as being online.

The topology view 1200 also indicates the queue name of each of the messaging queues 1285. The topology view 1200 includes a menu 1225, where a user may perform an action on an icon in the menu 1225 (e.g., keystroke, mouse click, pointing, touchscreen contact, etc.) using, for example, a mouse (or pointer, stylus, finger on a mobile device, etc.). Performing an action on an icon in the menu 1225 can expand portions of the menu 1225. For example, as shown in FIG. 12, the queues 1285-1 and 1285-3 associated with a second MOM system (MOM 2), are shown. A user may select a desired MOM system and queue to see more information on the selected items and/or to expand portions of the topology view 1200.

The topology view 1200 indicates connections between producer 1270 and messaging queue 1285-1, between messaging queue 1285-1 and messaging queues 1285-2, 1285-3 and 1285-4, and between messaging queues 1285-2, 1285-3 and 1285-4 and consumers 1290-1, 1290-2 and 1290-3, respectively.

Figure 13:
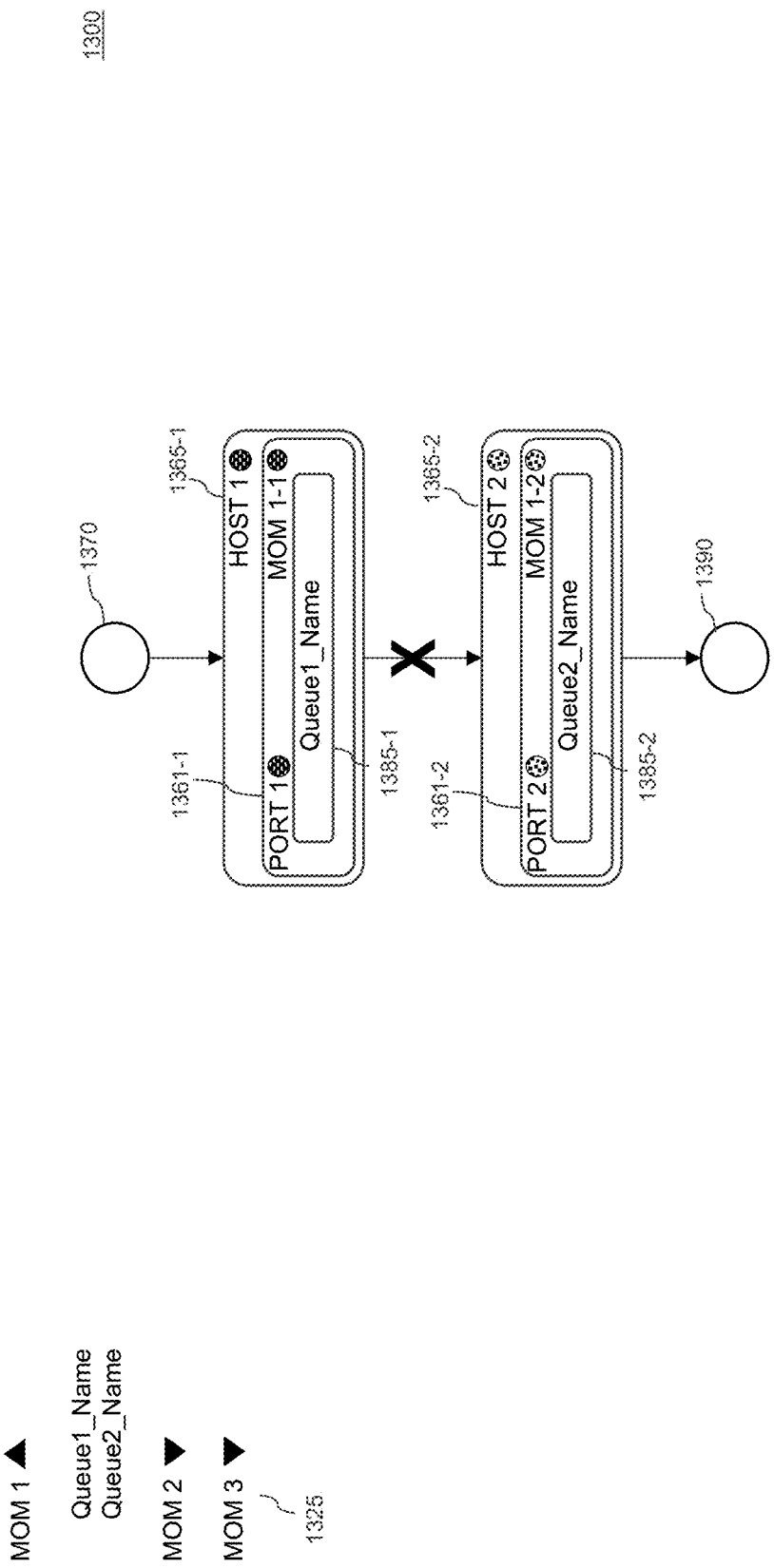
FIG. 13 is a block diagram of a user interface view of a P2P MOM topology in an illustrative embodiment.

FIG. 13 is a block diagram of a user interface view of a P2P MOM topology in an illustrative embodiment. The user interface topology view 1300 includes two messaging queues 1385-1 and 1385-2 between a message producer 1370 and a message consumer 1390. The topology view 1300 displays an online or offline status associated with each of the hosts 1365-1 and 1365-2, MOM servers 1361-1 and 1361-2, and each of the ports associated with the MOM servers 1361-1 and 1361-2. The online/offline status indicates to a user whether any of the hosts 1365-1 and 1365-2, MOM servers 1361-1 and 1361-2 and/or ports are operational, and if there is a potential problem with hosts 1365-1 and 1365-2, MOM servers 1361-1 and 1361-2 and/or ports that are offline. For example, in FIG. 13, MOM server 1361-2 and the corresponding port, and host 1365-2 are shown as being offline, while the other host, server and port in the topology view 1300 are shown as being online. FIG. 13 includes an "X" through an arrow connecting messaging queues 1385-1 and 1385-2 indicating that transmission of messages is not occurring due to the offline status of MOM server 1361-2, corresponding port, and host 1365-2.

The topology view 1300 also indicates the queue name of each of the messaging queues 1385-1 and 1385-2. The topology view 1300 includes a menu 1325, where a user may perform an action on an icon in the menu 1325 (e.g., keystroke, mouse click, pointing, touchscreen contact, etc.) using, for example, a mouse (or pointer, stylus, finger on a mobile device, etc.). Performing an action on an icon in the menu 1325 can expand portions of the menu 1325. For example, as shown in FIG. 13, the queues 1385-1 and 1385-2 associated with a first MOM system (MOM 1), are shown. A user may select a desired MOM system and queue to see more information on the selected items and/or to expand portions of the topology view 1300.

The topology view 1300 indicates a connection between producer 1370 and messaging queue 1385-1, between messaging queue 1385-1 and messaging queue 1385-2, and between messaging queue 1385-2 and consumer 1390.

It is to be understood that an interactive menu similar to the menus 1125, 1225 and 1325 may be provided with any of the topology views discussed herein. In addition, any of elements displayed in the topology views discussed herein, such as, for example, producers, consumers, exchanges, messaging queues, hosts, servers, connections, etc. can be interactive icons, which when clicked on or when a pointer associated with a mouse (or stylus, finger on a mobile device, etc.) is hovered over the corresponding icon, cause information about the selected icon to be displayed for users in the topology views.

FIGS. 3, 4, 5 and 7 illustrate other MOM topology types with different messaging patterns which may be illustrated in user interface topology views with producer, consumer, exchange, queue, connection, server and host details similar to or the same as those shown in FIGS. 9-13 and described herein above.

Figure 3:
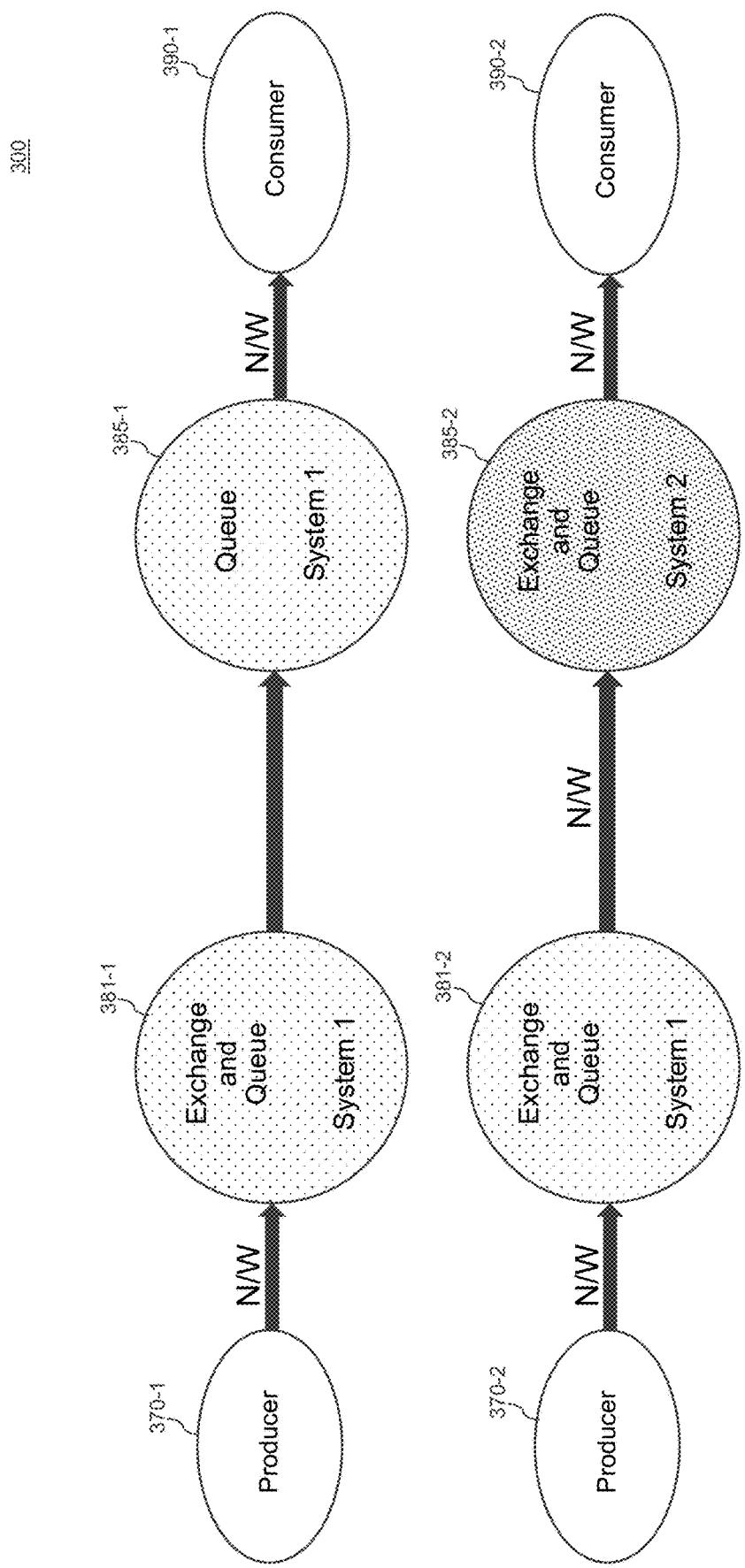
FIG. 3 is a block diagram of a point-to-point (P2P) MOM topology without routing in an illustrative embodiment.

For example, the topology 300 in FIG. 3 is an example of a P2P MOM topology without routing. In FIG. 3, producers 370-1 and 370-2 are respectively connected to messaging exchanges and queues (exchange/queue 381-1 and exchange/queue 381-2), which transmit messages to messaging queue 385-1 and messaging exchange/queue 385-2, respectively, for consumption by consumers 390-1 and 390-2, respectively. The queue 385-1 is connected to exchange/queue 381-1 without a network since they are on the same server. FIG. 3 indicates that exchange/queue 381-1, exchange/queue 381-2 and queue 385-1 correspond the same MOM platform (System 1). The exchange/queue 385-2 is on a different server associated with a different MOM platform (System 2), and is connected to the exchange/queue 381-2 via a network. In this and other instances described herein, an exchange and/or queue on a different server from other exchanges and/or queues may indicate that a consumer corresponding to the exchange and/or queue on the different server is using a different MOM provider than other consumers. For example, in the case of FIG. 3, consumer 390-2 may be using a different MOM provider than consumer 390-1. The producers 370-1 and 370-2 are respectively connected to exchange/queue 381-1 and exchange/queue 381-2 via one or more networks, and queue 385-1 and exchange/queue 385-2 are respectively connected to consumers 390-1 and 390-2 via one or more networks.

Figure 4:
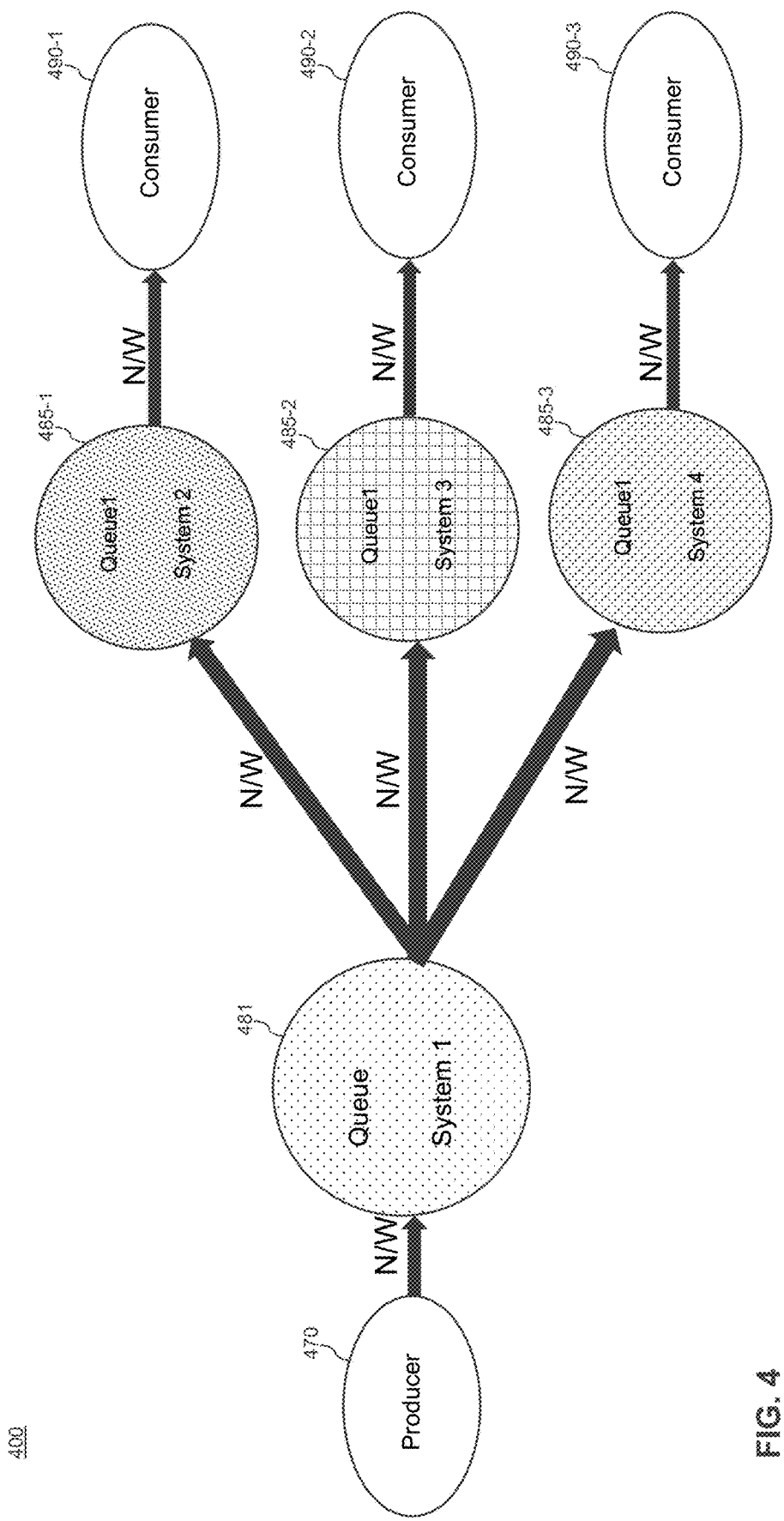
FIG. 4 is a block diagram of a P2P MOM topology without routing and with load balancing in an illustrative embodiment.

The topology 400 in FIG. 4 is an example of a P2P MOM topology with load balancing and without routing. In FIG. 4, a producer 470 is connected to a messaging queue 481 of System 1, which transmits messages to messaging queues 485-1, 485-2 and 485-3 of Systems 2, 3 and 4, respectively, for consumption by consumers 490-1, 490-2 and 490-3. In the FIG. 4 embodiment, in a load balancing arrangement, the queue 481 sends each message in the queue to the next queue (queue1, queue2 or queue3 485-1, 485-2 or 485-3), in sequence. In this round-robin distribution, each consumer 490-1, 490-2 and 490-3 receives approximately the same number of messages. For example, a first message will be transmitted to a first consumer 490-1, a second message to a second consumer 490-2, a third message to a third consumer 490-3, a fourth message to the first consumer 490-1 and so on.

Queue1, queue2 and queue 3 485-1, 485-2 and 485-3 are each on different servers associated with different MOM platforms from each other (System 2, System 3 and System 4), and from queue 481. Each of queue1, queue2 and queue 3 485-1, 485-2 and 485-3 are connected to queue 481 via a network. The producer 470 is connected to queue 481 via a network, and the queues 485-1, 485-2 and 485-3 are connected to consumers 490-1, 490-2 and 490-3 via one or more networks.

Figure 5:
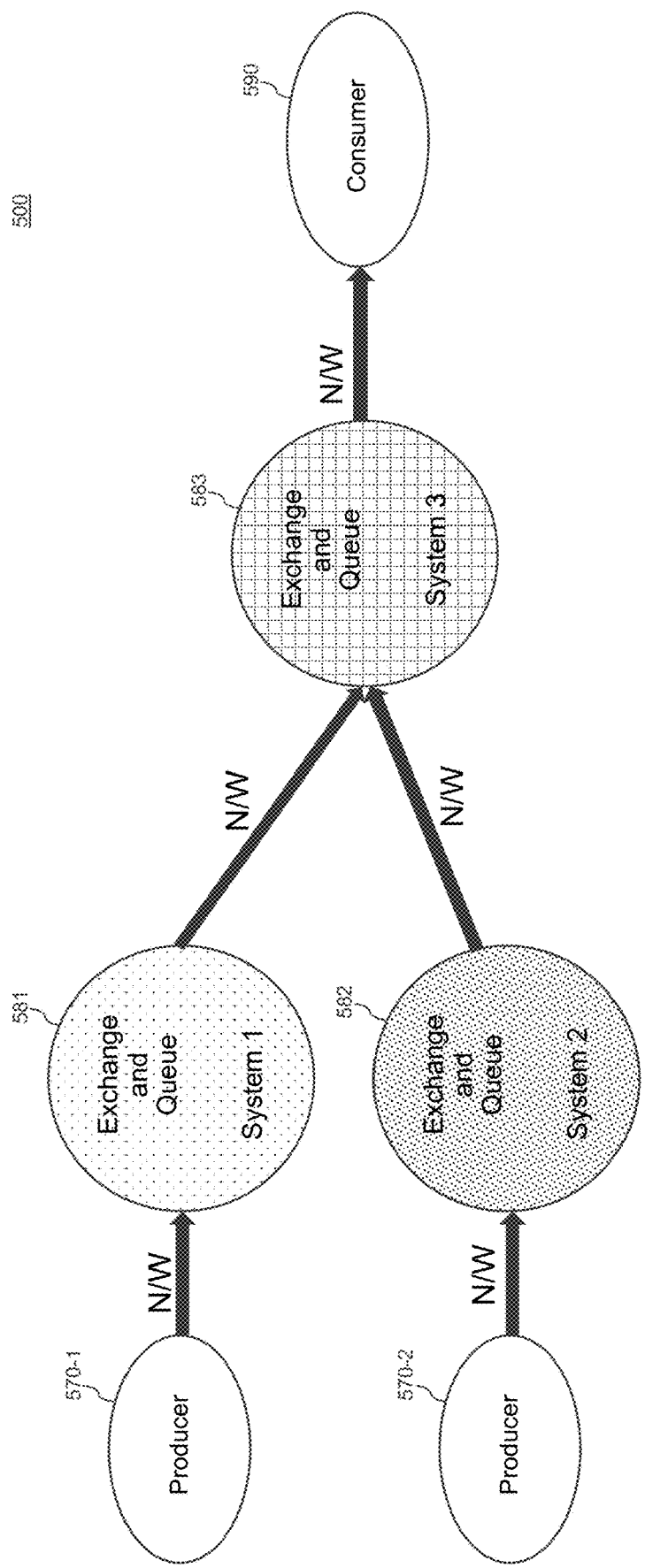
FIG. 5 is a block diagram a many-to-one P2P MOM topology without routing in an illustrative embodiment.

The topology 500 in FIG. 5 is an example of a many-to-one P2P MOM topology without routing. In FIG. 5, producers 570-1 and 570-2 are respectively connected to messaging exchanges and queues (exchange/queue 581 and exchange/queue 582) of System 1 and System 2, respectively, which transmit messages to messaging exchange and queue (exchange/queue) 583 of System 3 for consumption by a consumer 590. The exchange/queues 581, 582 and 583 are each on different servers from each other associated with different MOM platforms, so that exchange/queues 581 and 582 are each connected to exchange/queue 583 via a network. The producers 570-1 and 570-2 are respectively connected to exchange/queue 581 and exchange/queue 582 via one or more networks, and exchange/queue 583 is connected to consumer 590 via a network. In the many-to-one topology 500, there are multiple producers (e.g., 570-1 and 570-2) using different MOM systems (e.g., System 1 and System 2) that publish to one consumer (e.g., 590) using another MOM system (e.g., System 3).

Figure 7:
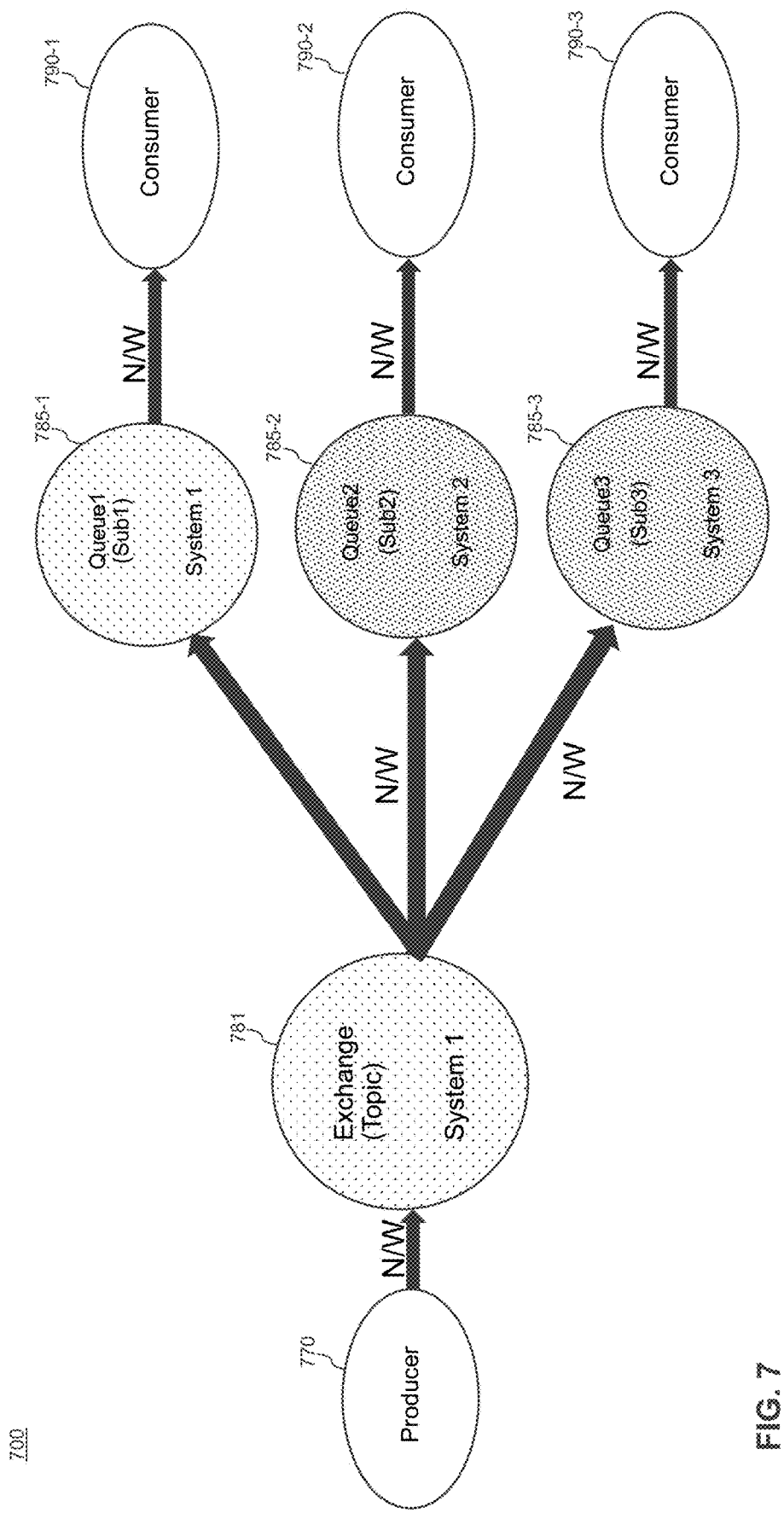
FIG. 7 is a block diagram of a fan-out MOM topology in an illustrative embodiment.

The topology 700 in FIG. 7 is an example of a fan-out MOM topology. In FIG. 7, a producer 770 is connected to an exchange 781, which sends copies of the same messages to message queues 785-1, 785-2 and 785-3 for consumption by consumers 790-1, 790-2 and 790-3. Queue1 785-1 is connected to exchange 781 without a network since they are on the same server. FIG. 7 indicates that exchange 781 and queue1 785-1 correspond the same MOM platform (System 1). Queue1 and Queue2 785-2 and 785-3 are on different servers associated with different MOM platforms (System 2 and System 3), and are connected to the exchange 781 via one or more networks. The producer 770 is connected to exchange 781 via one or more networks, and the queues 785-1, 785-2 and 785-3 are connected to consumers 790-1, 790-2 and 790-3 via one or more networks. In FIG. 7, like a broadcast, each message is routed to each of the messaging queues 785-1, 785-2 and/or 785-3 regardless of the topic or subscriptions Sub1, Sub2 and Sub3 of consumers 790-1, 790-2 and 790-3. A fan-out methodology ignores routing keys, copies a message and routes the message to all queues regardless of consumer subscription.

The front-end and back-end databases 123/223 and 141/241, and the shared NAS mount 142/242 in some embodiments are implemented using one or more storage systems or devices associated with the MOM topology platform 110. In some embodiments, one or more of the storage systems utilized to implement the front-end and back-end databases 123/223 and 141/241, and the shared NAS mount 142/242 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the MOM topology platform 110, the front-end server 120, the syncing engine 130, the back-end server 140, the agents layer 150 and/or the MOM servers layer 160 in other embodiments can be implemented at least in part externally to the MOM topology platform 110, for example, as stand-alone servers, sets of servers or other types of systems coupled to the network 104. For example, the front-end server 120, the syncing engine 130, the back-end server 140, the agents layer 150 and/or the MOM servers layer 160 may be provided as cloud services accessible by the MOM topology platform 110.

The front-end server 120, the syncing engine 130, the back-end server 140, the agents layer 150 and/or the MOM servers layer 160 in the FIG. 1 embodiment are each assumed to be implemented using at least one processing device. Each such processing device generally comprises at least one processor and an associated memory, and implements one or more functional modules for controlling certain features of the front-end server 120, the syncing engine 130, the back-end server 140, the agents layer 150 and/or the MOM servers layer 160.

At least portions of the MOM topology platform 110 and the components thereof may be implemented at least in part in the form of software that is stored in memory and executed by a processor. The MOM topology platform 110 and the components thereof comprise further hardware and software required for running the MOM topology platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the front-end server 120, the syncing engine 130, the back-end server 140, the agents layer 150, the MOM servers layer 160 and other components of the MOM topology platform 110 in the present embodiment are shown as part of the MOM topology platform 110, at least a portion of the front-end server 120, the syncing engine 130, the back-end server 140, the agents layer 150, the MOM servers layer 160 and other components of the MOM topology platform 110 in other embodiments may be implemented on one or more other processing platforms that are accessible to the MOM topology platform 110 over one or more networks. Such components can each be implemented at least in part within another system element or at least in part utilizing one or more stand-alone components coupled to the network 104.

It is assumed that the MOM topology platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the front-end server 120, the syncing engine 130, the back-end server 140, the agents layer 150, the MOM servers layer 160 and other components of the MOM topology platform 110, and the elements thereof can each be implemented in the form of one or more LXCs running on one or more VMs. Other arrangements of one or more processing devices of a processing platform can be used to implement the front-end server 120, the syncing engine 130, the back-end server 140, the agents layer 150 and the MOM servers layer 160, as well as other components of the MOM topology platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the MOM topology platform 110 to reside in different data centers. Numerous other distributed implementations of the MOM topology platform 110 are possible.

Accordingly, one or each of the front-end server 120, the syncing engine 130, the back-end server 140, the agents layer 150, the MOM servers layer 160 and other components of the MOM topology platform 110 can each be implemented in a distributed manner so as to comprise a plurality of distributed components implemented on respective ones of a plurality of compute nodes of the MOM topology platform 110.

It is to be appreciated that these and other features of illustrative embodiments are presented by way of example only, and should not be construed as limiting in any way.

Accordingly, different numbers, types and arrangements of system components such as the front-end server 120, the syncing engine 130, the back-end server 140, the agents layer 150, the MOM servers layer 160 and other components of the MOM topology platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the MOM topology platform can be offered to cloud infrastructure customers or other users as part of FaaS, CaaS and/or PaaS offerings.

Figure 15:
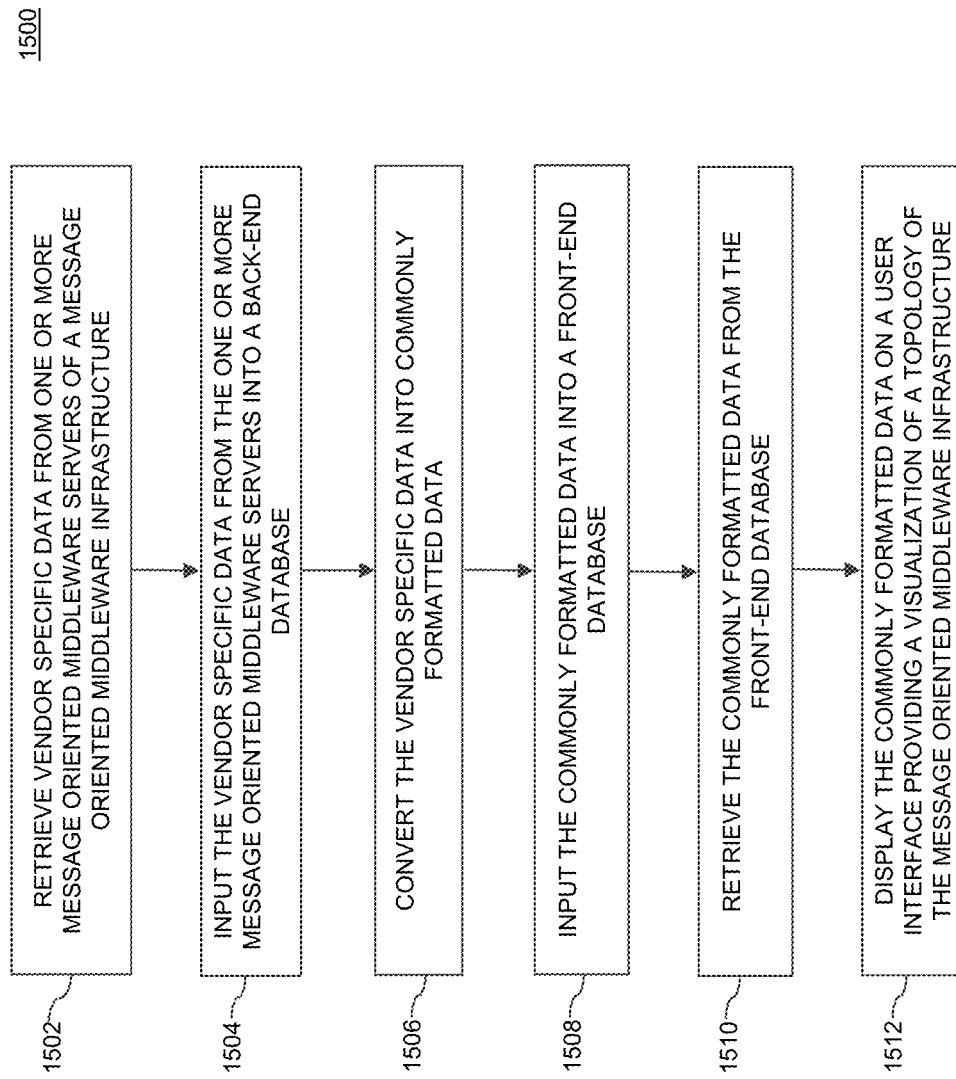
FIG. 15 is a flow diagram of a process for providing a user interface for viewing a messaging landscape and status information in an illustrative embodiment.

The operation of the information processing system 100 will now be described in further detail with reference to the flow diagram of FIG. 15. With reference to FIG. 15, a process 1500 for providing a user interface for viewing a messaging landscape and status information as shown includes steps 1502 through 1512, and is suitable for use in the system 100 but is more generally applicable to other types of information processing systems comprising a MOM topology platform configured for providing a user interface for viewing a messaging landscape and status information.

In step 1502, vendor specific data is retrieved from one or more MOM servers of a MOM infrastructure. Retrieving the vendor specific data comprises executing one or more vendor specific software agents to connect to the one or more MOM servers. The vendor specific data is in a native command format of the one or more MOM servers. In step 1504, the vendor specific data from the one or more MOM servers is inputted into a back-end database. Prior to inputting the vendor specific data into the back-end database, the vendor specific data can be stored in a shared NAS mount. In step 1506, the vendor specific data is converted into commonly formatted data. The commonly formatted data may be in JSON format.

In step 1508, the commonly formatted data is inputted into a front-end database. Users via, for example, user interfaces displayed on corresponding user devices initiate step 1510, in which the commonly formatted data is retrieved from the front-end database. The retrieval may be performed through one or more APIs.

In step 1512, the commonly formatted data is displayed on a user interface providing a visualization of a topology of the MOM infrastructure. The visualization displays a plurality of messaging queues connected between one or more message producers and one or more message consumers, a plurality of connections between the plurality of messaging queues and/or a plurality of connections between the plurality of messaging queues and at least one of the one or more message producers and the one or more message consumers. At least two of the plurality of messaging queues respectively correspond to different MOM servers.

The displayed commonly formatted data comprises, for example respective IP addresses corresponding to the messaging queues, the message producers and/or the message consumers, and one or more properties corresponding to the messaging queues. The properties include, for example, a depth of a given messaging queue, a time period that one or messages have been waiting in the given messaging queue, and a transmission time of a last message from the given messaging queue. The commonly formatted data associated with a given one of the plurality of messaging queues may be displayed in response to a user selecting the given one of the plurality of messaging queues via a user interface.

A visualization of the topology of a MOM infrastructure can also display a messaging pattern between one or more source queues and one or more target queues of a plurality of messaging queues, and/or a status of one or more servers respectively associated with one or more messaging queues of a plurality of messaging queues.

It is to be appreciated that the FIG. 15 process and other features and functionality described above can be adapted for use with other types of information systems configured to execute MOM topology visualization services on a MOM topology platform or other type of processing platform.

The particular processing operations and other system functionality described in conjunction with the flow diagram of FIG. 15 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a MOM topology platform as disclosed herein can provide a number of significant advantages relative to conventional arrangements. For example, one or more embodiments are configured to provide a user with a view of entire exchange-to-exchange (E2E) MOM integration on a single screen of a user device. The embodiments provide a user with a complete visualization of a messaging landscape and its runtime status via a single interactive user interface.

Using software agents to retrieve data in native command format, the embodiments advantageously permit a user access to heterogeneous MOM platforms to view messaging integration landscape, topology, integration status and statistics independent of propriety vendor protocols and commands. For example, upon clicking of messaging queues in the user interface, data corresponding to the heterogeneous MOM platforms is retrieved through APIs and translated into a topology view with statistical details of, for example, queues, producers and consumers in the topology.

The embodiments provide a light weight and MOM vendor neutral solution, which can be expanded to new MOM providers. Unlike conventional solutions, which require a user to navigate through to multiple vendor user interfaces in order to obtain data regarding the components of messaging landscape, the MOM topology platform, according to one or more embodiments, provides users with an optimized seamless end-to-end view of a messaging integration landscape via a single managed user interface. Unlike current techniques, which provide no visibility of messaging patterns, the embodiments also provide complete messaging pattern visibility, and display the health of each resource in a MOM topology so that users can easily pinpoint problems and develop solutions to resource failures.

The embodiments allow developers, support teams and administrators complete visibility of a MOM landscape through a single managed user interface providing a pictorial depiction of the topology, allowing for less time and effort to validate and monitor the health of a MOM integration. Advantageously, the embodiments do not require knowledge of individual MOM vendor protocols or commands to retrieve MOM integration landscape details from multiple MOM platforms in a messaging infrastructure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the MOM topology platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a MOM topology platform in illustrative embodiments. These and other cloud-based systems in illustrative embodiments can include object stores.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
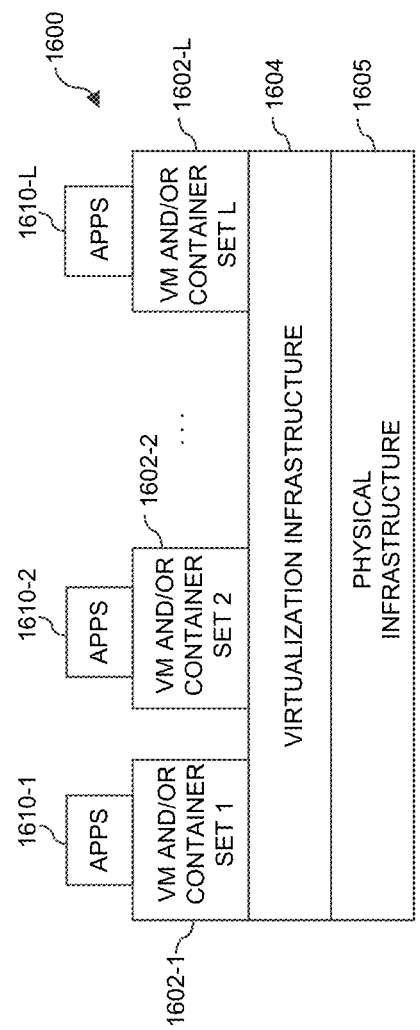
FIGS. 16 and 17 show examples of processing platforms that may be utilized to implement at least a portion of an information processing system in illustrative embodiments.
Figure 17:
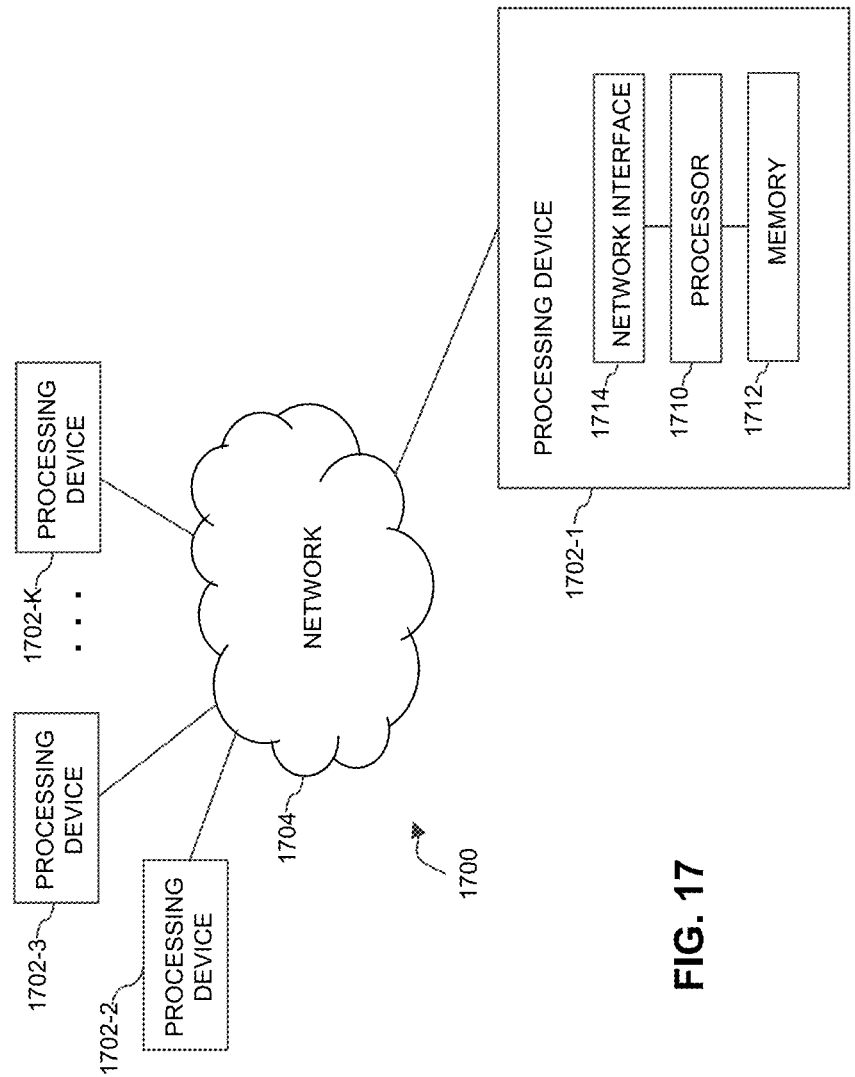

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712. The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the MOM topology platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and MOM topology platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to retrieve vendor specific data from one or more message oriented middleware servers of a message oriented middleware infrastructure;
   to input the vendor specific data from the one or more message oriented middleware servers into a back-end database;
   to convert the vendor specific data into commonly formatted data;
   to input the commonly formatted data into a front-end database;
   to retrieve the commonly formatted data from the front-end database; and
   to display the commonly formatted data on a user interface providing a visualization of a topology of the message oriented middleware infrastructure;
   wherein, in converting the vendor specific data into the commonly formatted data, said at least one processing platform is configured:
   to convert first terminology formatted in accordance with a convention of a first message oriented middleware server to terminology formatted in accordance with a convention of the commonly formatted data, wherein the first terminology represents message queue properties associated with transmission of a first plurality of messages via the first message oriented middleware server; and to convert second terminology formatted in accordance with a convention of a second message oriented middleware server to the terminology formatted in accordance with the convention of the commonly formatted data, wherein the second terminology represents message queue properties associated with transmission of a second plurality of messages via the second message oriented middleware server;

wherein the conventions of the first and second message oriented middleware servers are different from each other;

wherein the message queue properties associated with the transmission of the first and second plurality of messages comprise at least two of: a depth of a given messaging queue of a plurality of messaging queues, a time period that one or more messages have been waiting in the given messaging queue, and a transmission time of a last message from the given messaging queue;

wherein the visualization of the topology of the message oriented middleware infrastructure comprises a pictorial depiction displaying the first and second message oriented middleware servers between one or more message producers and one or more message consumers, the pictorial depiction further displaying first and second ones of the message queue properties as corresponding to respective ones of the first and second message oriented middleware servers; and wherein at least portions of the first and second ones of the message queue properties are displayed in the terminology formatted in accordance with the convention of the commonly formatted data.

2. The apparatus of claim 1 wherein, in retrieving the vendor specific data from the one or more message oriented middleware servers, said at least one processing platform is configured to execute one or more vendor specific software agents to connect to the one or more message oriented middleware servers.

3. The apparatus of claim 1 wherein the vendor specific data is in a native command format of the one or more message oriented middleware servers.

4. The apparatus of claim 1 wherein the commonly formatted data is in JavaScript Object Notation (JSON) format.

5. The apparatus of claim 1 wherein said at least one processing platform is further configured to store the vendor specific data in a shared network attached storage (NAS) mount prior to inputting the vendor specific data into the back-end database.

6. The apparatus of claim 1 wherein the visualization of the topology of the message oriented middleware infrastructure displays the plurality of messaging queues between the one or more message producers and the one or more message consumers.

7. The apparatus of claim 6 wherein at least two of the plurality of messaging queues respectively correspond to different message oriented middle ware servers.

8. The apparatus of claim 6 wherein the displayed commonly formatted data comprises an Internet Protocol address corresponding to at least one of the plurality of messaging queues, the one or more message producers and the one or more message consumers.

9. The apparatus of claim 6 wherein the visualization of the topology of the message oriented middleware infrastructure displays a plurality of connections between the plurality of messaging queues.

10. The apparatus of claim 6 wherein the visualization of the topology of the message oriented middleware infrastructure displays a plurality of connections between the plurality of messaging queues and at least one of the one or more message producers and the one or more message consumers.

11. The apparatus of claim 6 wherein the visualization of the topology of the message oriented middleware infrastructure displays a messaging pattern between one or more source queues and one or more target queues of the plurality of messaging queues.

12. The apparatus of claim 6 wherein the visualization of the topology of the message oriented middleware infrastructure displays a status of the first and second message oriented middleware servers respectively associated with one or more messaging queues of the plurality of messaging queues.

13. The apparatus of claim 6 wherein said at least one processing platform is configured to display the commonly formatted data associated with the given messaging queue in response to a user selecting the given messaging queue via the user interface.

14. A method comprising:

retrieving vendor specific data from one or more message oriented middleware servers of a message oriented middleware infrastructure;

inputting the vendor specific data from the one or more message oriented middleware servers into a back-end database;

converting the vendor specific data into commonly formatted data;

inputting the commonly formatted data into a front-end database;

retrieving the commonly formatted data from the front-end database; and displaying the commonly formatted data on a user interface providing a visualization of a topology of the message oriented middleware infrastructure;

wherein converting the vendor specific data into the commonly formatted data comprises:

converting first terminology formatted in accordance with a convention of a first message oriented middleware server to terminology formatted in accordance with a convention of the commonly formatted data, wherein the first terminology represents message queue properties associated with transmission of a first plurality of messages via the first message oriented middleware server; and converting second terminology formatted in accordance with a convention of a second message oriented middleware server to the terminology formatted in accordance with the convention of the commonly formatted data, wherein the second terminology represents message queue properties associated with transmission of a second plurality of messages via the second message oriented middleware server;

wherein the conventions of the first and second message oriented middleware servers are different from each other;

wherein the message queue properties associated with the transmission of the first and second plurality of messages comprise at least two of: a depth of a given messaging queue of a plurality of messaging queues, a time period that one or more messages have been waiting in the given messaging queue, and a transmission time of a last message from the given messaging queue;

wherein the visualization of the topology of the message oriented middleware infrastructure comprises a pictorial depiction displaying the first and second message oriented middleware servers between one or more message producers and one or more message consumers, the pictorial depiction further displaying first and second ones of the message queue properties as corresponding to respective ones of the first and second message oriented middleware servers;

wherein at least portions of the first and second ones of the message queue properties are displayed in the terminology formatted in accordance with the convention of the commonly formatted data; and wherein the method is performed by at least one processing platform comprising at least one processing device comprising a processor coupled to a memory.

15. The method of claim 14 wherein retrieving the vendor specific data from the one or more message oriented middleware servers comprises executing one or more vendor specific software agents to connect to the one or more message oriented middleware servers.

16. The method of claim 14 wherein the visualization of the topology of the message oriented middleware infrastructure displays the plurality of messaging queues connected between the one or more message producers and the one or more message consumers, and a plurality of connections between the plurality of messaging queues.

17. The method of claim 16 wherein the visualization of the topology of the message oriented middleware infrastructure displays a status of the first and second message oriented middleware servers respectively associated with one or more messaging queues of the plurality of messaging queues.

18. A computer program product comprising a non-transitory processor-readable storage medium having stored therein program code of one or more software programs, wherein the program code when executed by at least one processing platform causes said at least one processing platform:

to retrieve vendor specific data from one or more message oriented middleware servers of a message oriented middleware infrastructure;

to input the vendor specific data from the one or more message oriented middleware servers into a back-end database;

to convert the vendor specific data into commonly formatted data;

to input the commonly formatted data into a front-end database;

to retrieve the commonly formatted data from the front-end database; and to display the commonly formatted data on a user interface providing a visualization of a topology of the message oriented middleware infrastructure;

wherein, in converting the vendor specific data into the commonly formatted data, the program code causes said at least one processing platform:

to convert first terminology formatted in accordance with a convention of a first message oriented middleware server to terminology formatted in accordance with a convention of the commonly formatted data, wherein the first terminology represents message queue properties associated with transmission of a first plurality of messages via the first message oriented middleware server; and to convert second terminology formatted in accordance with a convention of a second message oriented middleware server to the terminology formatted in accordance with the convention of the commonly formatted data, wherein the second terminology represents message queue properties associated with transmission of a second plurality of messages via the second message oriented middleware server;

wherein the conventions of the first and second message oriented middleware servers are different from each other;

wherein the message queue properties associated with the transmission of the first and second plurality of messages comprise at least two of: a depth of a given messaging queue of a plurality of messaging queues, a time period that one or more messages have been waiting in the given messaging queue, and a transmission time of a last message from the given messaging queue;

wherein the visualization of the topology of the message oriented middleware infrastructure comprises a pictorial depiction displaying the first and second message oriented middleware servers between one or more message producers and one or more message consumers, the pictorial depiction further displaying first and second ones of the message queue properties as corresponding to respective ones of the first and second message oriented middleware servers; and wherein at least portions of the first and second ones of the message queue properties are displayed in the terminology formatted in accordance with the convention of the commonly formatted data.

19. The computer program product according to claim 18 wherein the visualization of the topology of the message oriented middleware infrastructure displays the plurality of messaging queues connected between the one or more message producers and the one or more message consumers, and a plurality of connections between the plurality of messaging queues.

20. The computer program product according to claim 19 wherein the visualization of the topology of the message oriented middleware infrastructure displays a status of the first and second message oriented middleware servers respectively associated with one or more messaging queues of the plurality of messaging queues.

* * * * *